(12) United States Patent
Noguchi et al.

(10) Patent No.: US 12,718,035 B2
(45) Date of Patent: Aug. 25, 2026

(54) LASER MARKER

(71) Applicant: BROTHER KOGYO KABUSHIKI KAISHA, Nagoya (JP)

(72) Inventors: Keisuke Noguchi, Arakawa-ku (JP); Kazuhiro Nakashima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 1044 days.

(21) Appl. No.: 17/207,228

(22) Filed: Mar. 19, 2021

(65) Prior Publication Data

US 2021/0209317 A1 Jul. 8, 2021

Related U.S. Application Data

(63) Continuation of application No. PCT/JP2019/043220, filed on Nov. 5, 2019.

(30) Foreign Application Priority Data

Nov. 30, 2018 (JP) ................................ 2018-224323

(51) Int. Cl.
*G06K 1/12* (2006.01)
*B23K 26/10* (2006.01)

(52) U.S. Cl.
CPC ............ *G06K 1/126* (2013.01); *B23K 26/103* (2013.01)

(58) Field of Classification Search
CPC .... G06K 1/126; B23K 26/103; B23K 26/082; B23K 26/355; B23K 26/362; B23K 26/706; B23K 37/006; B23K 26/707; B41J 2/47
See application file for complete search history.

(56) References Cited

U.S. PATENT DOCUMENTS 6,064,033 A 5/2000 Carbonato et al.
7,626,690 B2 * 12/2009 Kumagai ................ G01S 17/42 359/399

(Continued)

FOREIGN PATENT DOCUMENTS

JP S62-015878 U 1/1987
JP S63-174983 U 11/1988

(Continued)

OTHER PUBLICATIONS

International Search Report mailed Dec. 24, 2019 in connection with PCT/JP19/043220.

(Continued)

*Primary Examiner* — Helena Kosanovic
*Assistant Examiner* — Thao Uyen Tran-Le
(74) *Attorney, Agent, or Firm* — HOGAN LOVELLS US LLP

(57) ABSTRACT

A laser marker includes a laser light source; a scanner configured to scan laser light, from the laser light source, outward; a first housing accommodating the laser light source; a second housing accommodating the scanner, the second housing being rotatable with respect to the first housing; a sensor configured to output a detection signal; and a controller configured to: based on receiving the detection signal indicating that the rotation position of the second housing is either in a first or second rotation position from the sensor, control the laser light source to emit the laser light outward; and based on receiving the detection signal, not indicating that the rotation position of the second housing is either in the first or second rotation position, control the laser light source not to emit the laser light outward.

24 Claims, 16 Drawing Sheets

(56) References Cited

U.S. PATENT DOCUMENTS 8,399,803 B2* 3/2013 Idaka .................. B23K 26/082 700/166
2002/0170886 A1* 11/2002 Lawson ............ B23K 26/0821 219/121.73
2003/0206227 A1 11/2003 Assa et al.
2004/0130612 A1 7/2004 Assa et al.
2004/0141052 A1 7/2004 Assa et al.
2005/0134678 A1 6/2005 Franklin et al.
2007/0121682 A1* 5/2007 Ichikawa ............ B23K 26/082 372/9
2008/0017619 A1* 1/2008 Yamakawa ........... G06K 1/121 219/121.81
2008/0116183 A1* 5/2008 Curry .................... B23K 26/40 219/121.75
2008/0259425 A1* 10/2008 Boettcher ........... B23K 26/082 359/201.1
2010/0170372 A1* 7/2010 Tatsuda ............... B23Q 1/5406 82/146
2011/0073576 A1* 3/2011 Bucklew ........... B23K 26/0846 219/121.72
2011/0304836 A1* 12/2011 Tanioka .................. H04N 3/08 355/67
2012/0212564 A1* 8/2012 Yamamoto ............ B41M 5/284 347/225
2013/0160622 A1* 6/2013 Shigematsu .......... B21D 28/02 83/23
2015/0079216 A1* 3/2015 Brooks ............... B23K 26/355 285/272
2015/0247588 A1* 9/2015 Matalon ............... F16K 35/025 137/556
2016/0341957 A1* 11/2016 Kano ..................... G01S 17/06
2017/0008128 A1* 1/2017 Ishiguro .............. B23K 26/382
2017/0266758 A1* 9/2017 Fukui .................. B23K 26/042
2018/0071864 A1* 3/2018 Díaz ........................ C21D 9/46
2018/0354070 A1* 12/2018 Nogami ............ B23K 26/0884
2019/0366491 A1* 12/2019 Ozturk ................... B23P 6/007
2020/0040688 A1* 2/2020 Yousef ................... E21B 23/00

FOREIGN PATENT DOCUMENTS

JP 2000-042778 A 2/2000
JP 2001-096387 A 4/2001
JP 2003-531010 T 10/2003
JP 2004333367 A * 11/2004
JP 3668962 B2 7/2005
JP 2007-519526 T 7/2007
JP 2009276492 A * 11/2009
JP 2013-013902 A 1/2013
WO 01/080160 A2 10/2001
WO 2005/062833 A2 4/2005

OTHER PUBLICATIONS

International Search Report mailed Dec. 24, 2019 in connection with PCT/JP19/043219.
International Preliminary Report on Patentability (PCT/IB/373) dated May 25, 2021 and English Translation of Written Opinion of the International Searching Authority (PCT/ISA/237) issued in connection with PCT/JP19/043220.
Extended European Search Report for corresponding European patent application No. 19888438.9, dated Aug. 30, 2022. (4 pages.).

* cited by examiner 20B
22B
56
46
40
60
27
32
30
52
50
S1
C
22A
20A
1
42B
28
42
44
S2
42A
12
13
11
FRONT
UP
REAR
DOWN

FIG. 13

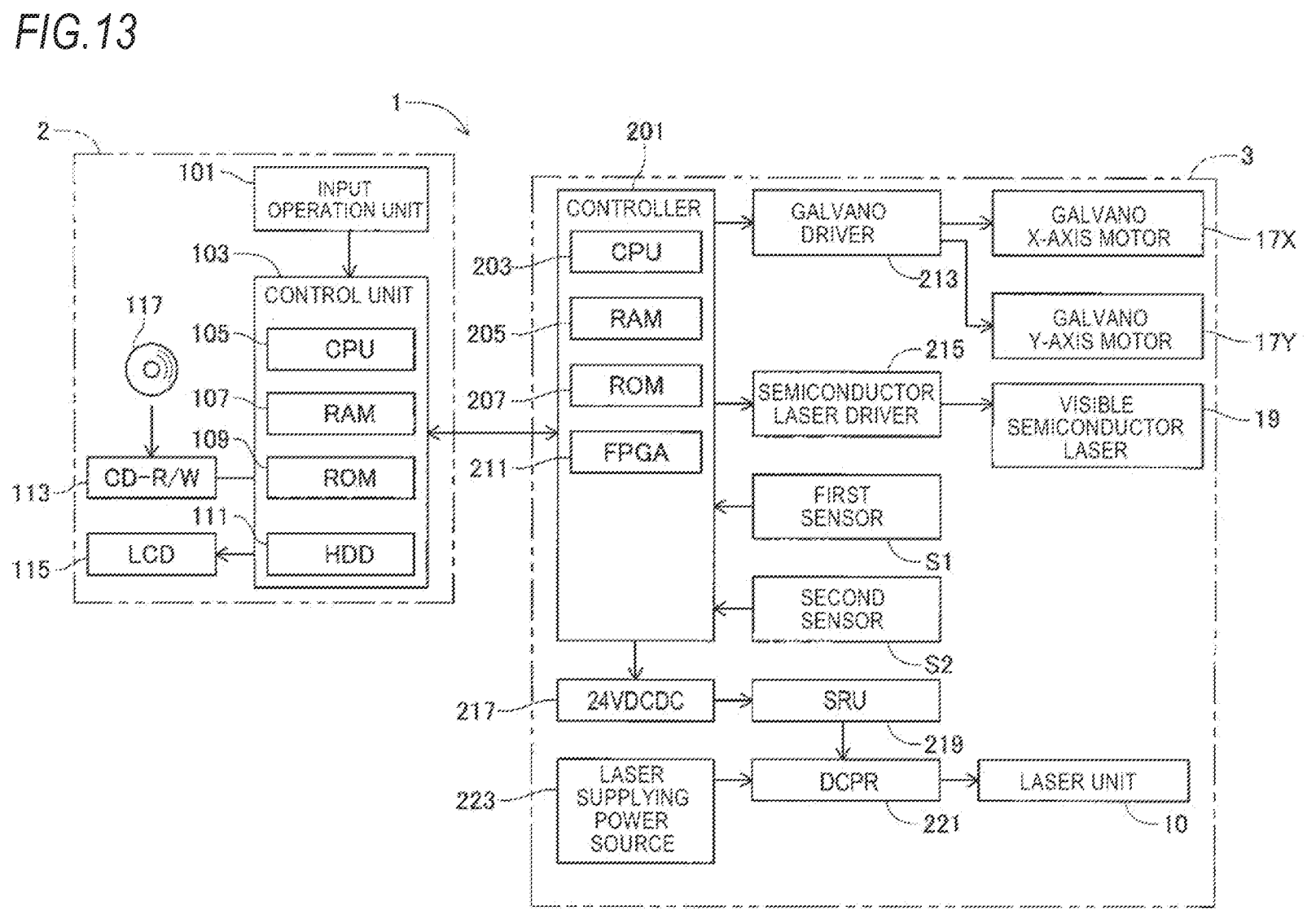

1
2
INPUT OPERATION UNIT
101
CONTROL UNIT
103
CPU
105
RAM
107
ROM
109
HDD
111
117
CD-R/W
113
LCD
115
3
CONTROLLER
201
CPU
203
RAM
205
ROM
207
FPGA
211
24VDCDC
217
LASER SUPPLYING POWER SOURCE
223
GALVANO DRIVER
213
SEMICONDUCTOR LASER DRIVER
215
FIRST SENSOR
S1
SECOND SENSOR
S2
SRU
219
DCPR
221
GALVANO X-AXIS MOTOR
17X
GALVANO Y-AXIS MOTOR
17Y
VISIBLE SEMICONDUCTOR LASER
19
LASER UNIT
10

| FIRST SENSOR | SECOND SENSOR | SENSOR STATE | 24VDCDC |
|---|---|---|---|
| 0 | 0 | ROTATION | OFF |
| 0 | 1 | 90 DEGREES | ON |
| 1 | 0 | 0 DEGREE | ON |
| 1 | 1 | NA | NA |

LASER MARKER

CROSS-REFERENCE TO RELATED APPLICATION

This is a continuation application of International Application No. PCT/JP2019/043220 filed on Nov. 5, 2019 which claims priority from Japanese Patent Application No. 2018-224323 filed on Nov. 30, 2018. The entire subject-matter of the earlier application is incorporated herein by reference.

TECHNICAL FIELD

The present disclosure relates to a laser marker.

BACKGROUND

A variety of technologies relating to a laser marker configured to emit laser light. For example, a related art discloses a printing system having a bearing for enabling a printing beam exit member to rotate with respect to a housing.

SUMMARY

One illustrative aspect of the present disclosure provides a laser marker including: a laser light source; a scanner configured to scan laser light, from the laser light source, outward; a first housing accommodating the laser light source; a second housing connected to the first housing and accommodating the scanner, the second housing being rotatable with respect to the first housing; a sensor configured to output a detection signal, the detection signal indicating a rotation position of the second housing; and a controller configured to: based on receiving the detection signal, indicating that the rotation position of the second housing is either in a first rotation position or in a second rotation position, from the sensor, control the laser light source to emit the laser light outward; and based on receiving the detection signal, not indicating that the rotation position of the second housing is either in the first rotation position or in the second rotation position, from the sensor, control the laser light source not to emit the laser light outward.

According to the one illustrative aspect of the present disclosure, the laser marker ensures safety by making it impossible for the laser light to be emitted outward when the second housing in which the scanner configured to scan the laser light outward is accommodated is rotated and is not in a predetermined position.

BRIEF DESCRIPTION OF DRAWINGS

Aspects of the disclosure are illustrated by way of example and not by limitation in the accompanying figures in which like reference characters indicate similar elements.

FIG. 13 is a block diagram depicting an electrical configuration of the laser marker.

FIG. 14 depicts a truth table of the laser marker.

DETAILED DESCRIPTION

According to the related art, in a case where the printing beam exit member rotates via the bearing while a printing beam is emitted outward from the printing beam exit member, the printing beam may be emitted in an unexpected direction, which is not favorable.

Therefore, illustrative aspects of the disclosure provide a laser marker that ensures safety by making it impossible for laser light to be emitted outward when a second housing in which a scanner configured to scan the laser light outward is accommodated is rotated and is not in a predetermined position.

Hereinbelow, the laser marker of the present disclosure will be described with reference to the drawings, based on illustrative embodiments. In FIGS. 1 to 12 and 16 used for descriptions below, some of the basic configuration are omitted, and the dimensional ratios of the shown parts are not always accurate. Note that, in descriptions below, the upper and lower direction, the front and back direction, and the right and left direction are as shown in FIGS. 2 to 12 and 16.

Figure 1:
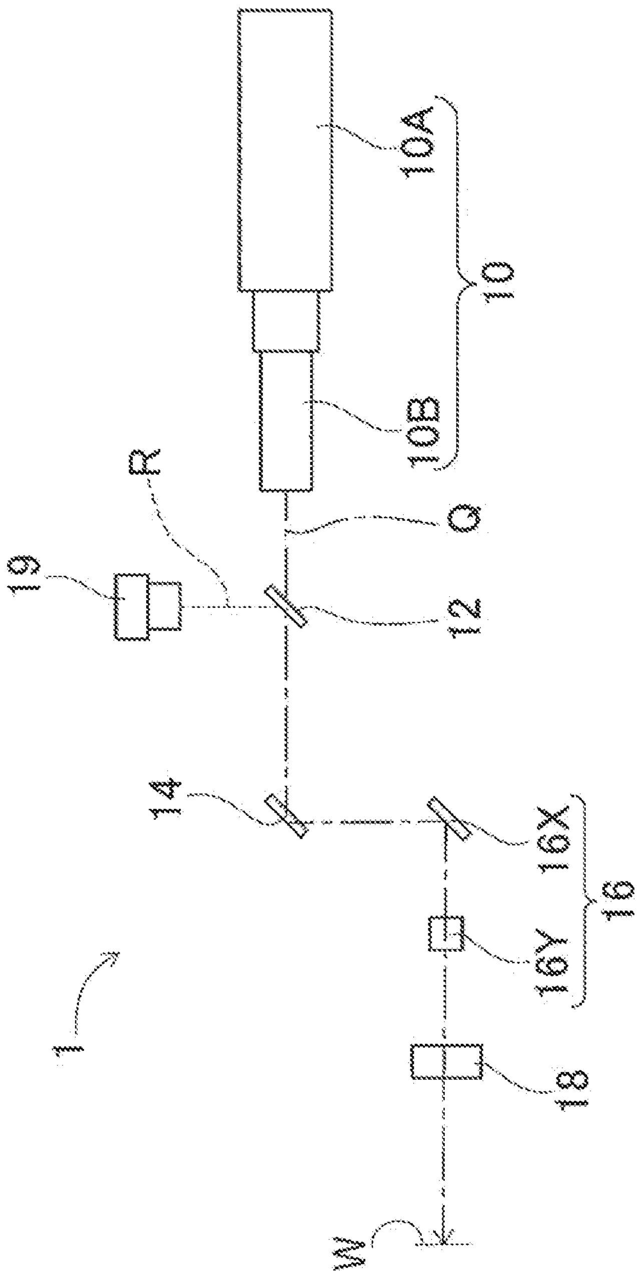
FIG. 1 depicts a schematic configuration of a laser marker of the present illustrative embodiment.

As shown in FIG. 1, a laser marker 1 of the present illustrative embodiment includes a laser unit 10, a dichroic mirror 12, a reflecting mirror 14, a galvano scanner 16, an fθ lens 18, a visible semiconductor laser 19, and the like.

The laser unit 10 has a laser oscillator 10A, a beam expander 10B, and the like. The laser oscillator 10A is constituted by $CO_2$ laser, YAG laser and the like, and is configured to emit laser light Q. A light diameter of the laser light Q is adjusted (for example, expanded) by the beam expander 10B.

The visible semiconductor laser 19 is configured to emit visible laser light R, for example, red laser light, which is visible interfering light. The visible laser light R is used so as to project a print pattern image, which is to be marked (printed) by the laser light Q, to a processing target W, for example. Note that, a wavelength of the visible laser light R is different from a wavelength of the laser light Q. In the present illustrative embodiment, for example, the wavelength of the laser light Q is 1064 nm, and the wavelength of the visible laser light R is 650 nm.

In the dichroic mirror 12, almost all of the incident laser light Q is penetrated. In the dichroic mirror 12, the visible laser light R is incident at an incident angle of 45 degrees and is reflected onto a light path of the laser light Q at a reflection angle of 45 degrees, in a substantially central position in which the laser light Q is penetrated. The reflectance of the dichroic mirror 12 depends on wavelengths. Specifically, the dichroic mirror 12 is surface-treated with a multi-layered structure of a dielectric layer and a metal layer, has high reflectance for the wavelength of the visible laser light R, and is configured to cause most (99%) of light of other wavelengths to be penetrated therethrough.

Note that, the dotted line in FIG. 1 indicates an optical axis of the visible laser light R. In contrast, the dashed-dotted line in FIG. 1 indicates an optical axis of the laser light Q. In addition, among the dashed-dotted lines in FIG. 1, the dashed-dotted line between the dichroic mirror 12 and the processing target W also indicates the optical axis of the visible laser light R.

The laser light Q penetrating the dichroic mirror 12 and the visible laser light R reflected on the dichroic mirror 12 are reflected on the reflecting mirror 14 toward the galvano scanner 16.

The galvano scanner 16 is to two-dimensionally scan the laser light Q and the visible laser light R reflected on the reflecting mirror 14. In the galvano scanner 16, a galvano X-axis motor 17X and a galvano Y-axis motor 17Y shown in FIG. 13, which will be described later, are arranged such that motor shafts thereof are orthogonal to each other, and scanning mirrors 16X and 16Y attached to tip end portions of each of the motor shafts face each other on inner sides. In the galvano scanner 16, in a case where each of the motors 17X and 17Y is drive-controlled, each of the scanning mirrors 16X and 16Y is rotated, so that the laser light Q and the visible laser light R are two-dimensionally scanned. The two-dimensional scanning directions are X and Y directions.

The fθ lens 18 is to focus the laser light Q and the visible laser light R two-dimensionally scanned by the galvano scanner 16 onto the processing target W. Therefore, the laser light Q and the visible laser light R are two dimensionally scanned on the processing target W under drive control on each of the motors 17X and 17Y.

Figure 2:
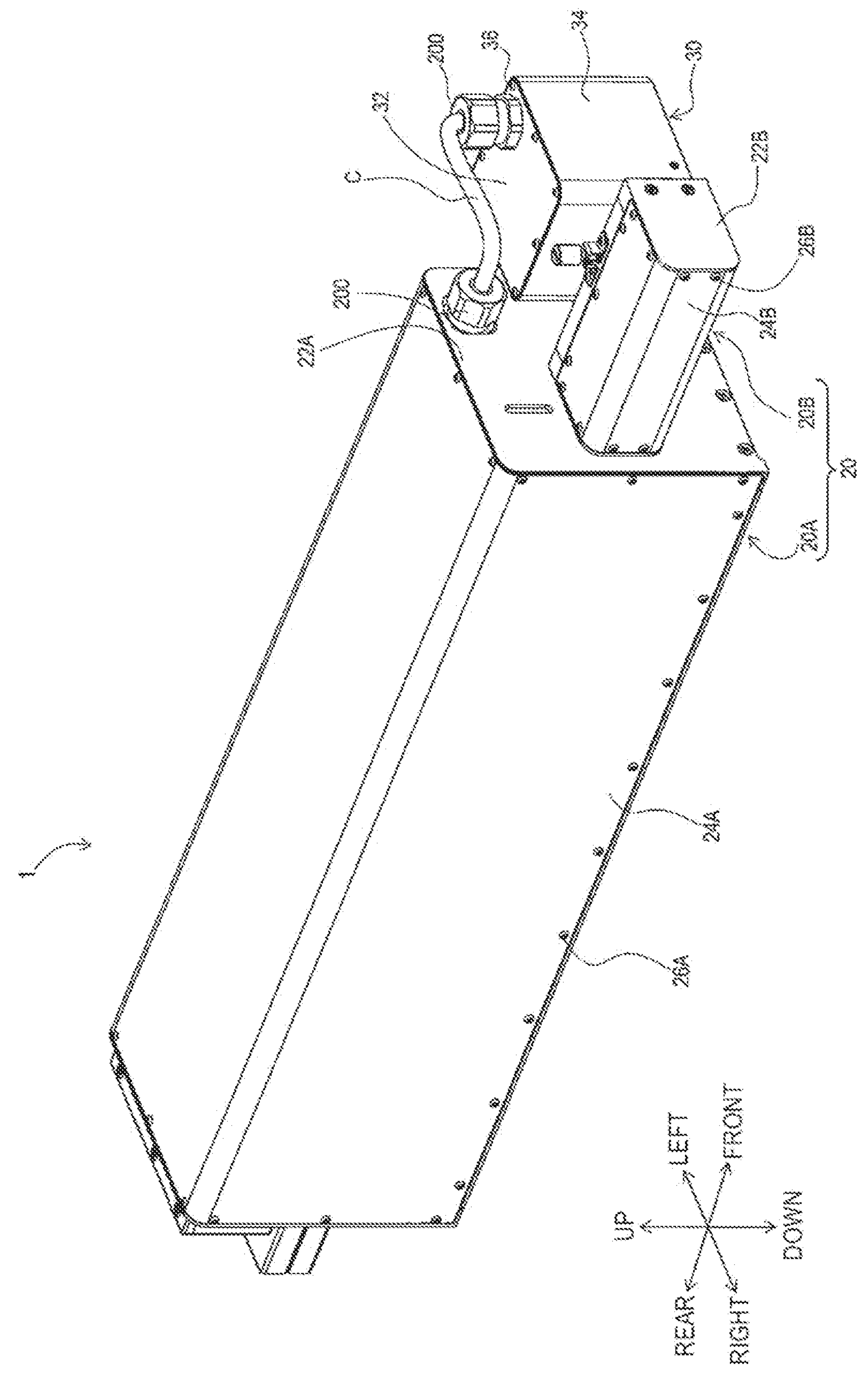
FIG. 2 is a perspective view depicting the laser marker.

As shown in FIG. 2, the laser marker 1 of the present illustrative embodiment includes a first housing 20, a second housing 30 and the like. The first housing 20 is constituted by a rear first housing 20A and a front first housing 20B. The rear first housing 20A, the front first housing 20B, and the second housing 30 each have a substantially cuboid shape.

The rear first housing 20A has the laser unit 10 and the like housed therein, and has a rear main body 22A and a rear cover 24A. The laser unit 10 and the like are attached to the rear main body 22A, and the rear cover 24A is fixed to the rear main body by a plurality of screws 26A. Thereby, the laser unit 10 is accommodated in the first housing 20.

The front first housing 20B is attached to the rear main body 22A of the rear first housing 20A from a front direction-side. The front first housing 20B has the dichroic mirror 12, the reflecting mirror 14, the visible semiconductor laser 19 and the like housed therein, and has a front main body 22B and a front cover 24B. The dichroic mirror 12, the reflecting mirror 14, the visible semiconductor laser 19 and the like are attached to the front main body 22B, and the front cover 24B is fixed to the front main body by a plurality of screws 26B. Thereby, the dichroic mirror 12, the reflecting mirror 14, and the visible semiconductor laser 19 are accommodated in the first housing 20.

The second housing 30 has the galvano scanner 16 and the like housed therein, and has a main body 32 and a cover 34. The galvano scanner 16 and the like are attached to the main body 32 (refer to FIGS. 6 and 10 which will be described later), and the cover 34 is fixed to the main body by a plurality of screws 36. Thereby, the galvano scanner 16 is accommodated in the second housing 30. In addition, the fθ lens 18 is fitted to the main body 32 of the second housing 30 (refer to FIGS. 4 and 6 which will be described later). Thereby, the galvano scanner 16 can two-dimensionally scan the laser light Q and the visible laser light R reflected on each of the scanning mirrors 16X and 16Y via the fθ lens 18 at an outside of the laser marker 1 of the present illustrative embodiment.

A cable C of the galvano scanner 16 is bridged between the second housing 30 and the rear first housing 20A. The cable C is taken in the second housing 30 and the rear first housing 20A via cable grounds 200.

Figure 3:
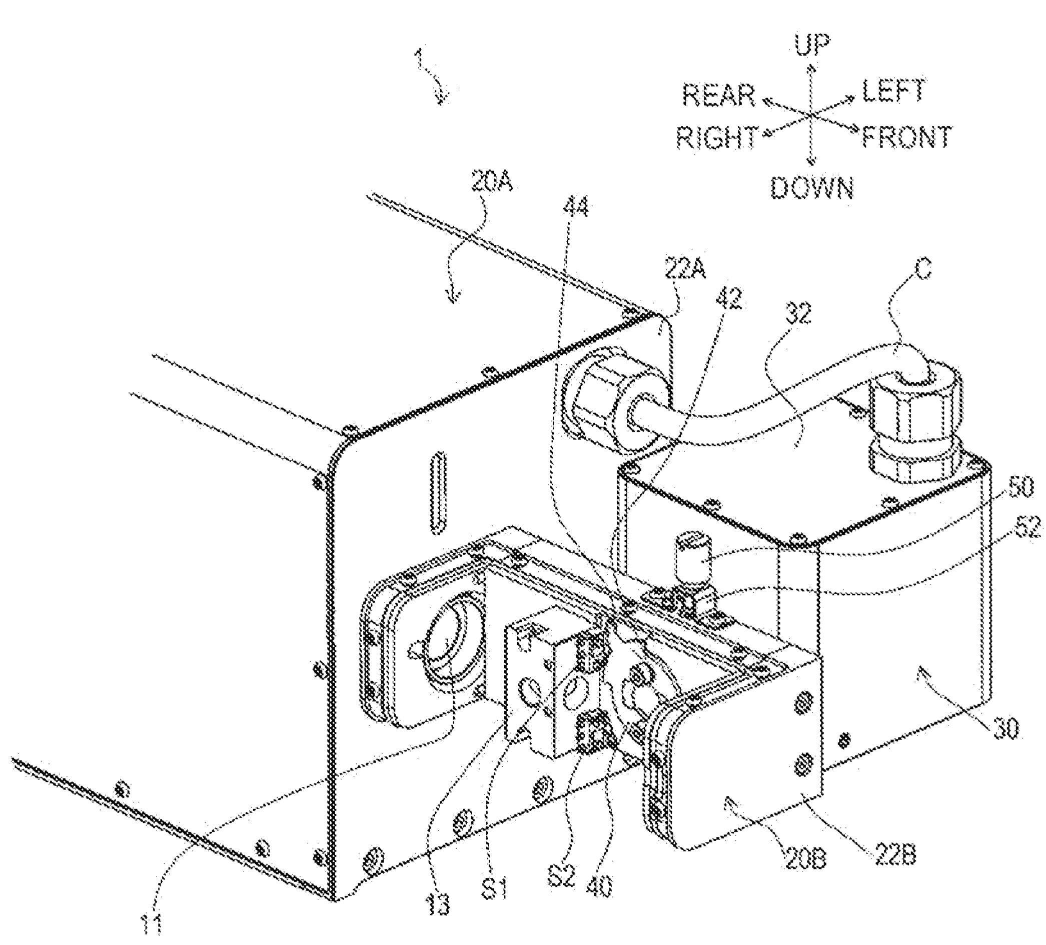
FIG. 3 is a perspective view depicting a part of the laser marker when a second housing is in a state where it is fixed in a first rotation position.
Figure 4:
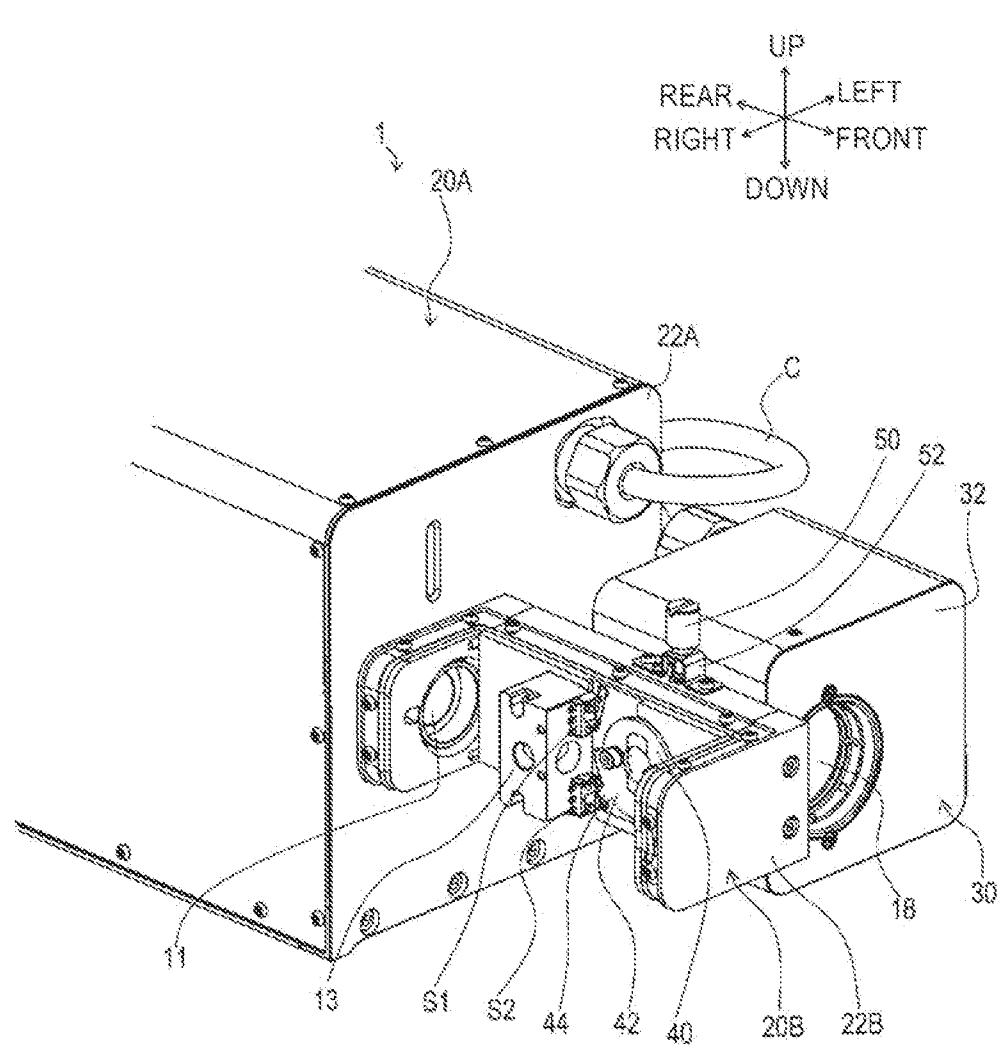
FIG. 4 is a perspective view depicting a part of the laser marker in a case where the second housing is in a state where it is fixed in a second rotation position.

FIGS. 3 and 4 are perspective views depicting a front part of the laser marker 1 of the present illustrative embodiment, in which the front cover 24B is removed from the front main body 22B. The laser marker 1 of the present illustrative embodiment can change a direction of the second housing 30 to a direction shown in FIG. 3 or a direction shown in FIG. 4. For this reason, the second housing 30 is provided so as to be rotatable with respect to the front first housing 20B by a connecting member 60 shown in FIG. 5 and the like, which will be described later. Note that, the connecting member 60 will be described in detail later.

In the present illustrative embodiment, a case where the direction of the second housing 30 is the direction shown in FIG. 3 is referred to as "(the rotation position of) the second housing 30 is in a first rotation position." In this case, the fθ lens 18 faces downward. In contrast, a case where the direction of the second housing 30 is the direction shown in FIG. 4 is referred to as "(the rotation position of) the second housing 30 is in a second rotation position." In this case, the fθ lens 18 faces forward. The laser marker 1 of the present illustrative embodiment can rotate the second housing 30 with respect to the first housing 20 within a range from 0 degree to 90 degrees.

In the laser marker 1 of the present illustrative embodiment, the rotation position of the second housing 30 can be fixed to the first rotation position shown in FIG. 3 or the second rotation position shown in FIG. 4 by a lock mechanism L shown in FIG. 6 and the like, which will be described later. Note that, the lock mechanism L has a pin 50, an attaching plate 52 and the like provided to the front main body 22B of the front first housing 20B, and they will be described in detail later.

At a place where the front first housing 20B is attached to the rear first housing 20A, a transmission window 11 is provided over the front main body 22B and the rear main body 22A. The laser light Q emitted from the laser unit 10 passes through the transmission window 11 from the rear first housing 20A toward the front first housing 20B.

The front main body 22B of the front first housing 20B is provided with a holder 13, a circular plate 40, a first sensor S1, a second sensor S2, the reflecting mirror 14 and the like. The holder 13 is attached to the front main body 22B. The visible semiconductor laser 19 is attached with being incorporated to a substrate (not shown) to the holder 13. The dichroic mirror 12 and the like are also attached to the holder 13. The first sensor S1 and the second sensor S2 are attached to a front wall surface of the holder 13. The first sensor S1 and the second sensor S2 are microswitches.

The circular plate 40 has an opening formed at a center thereof, and is configured to rotate together with the second housing 30. The details thereof will be described later. The circular plate 40 is formed with a protrusion 42 protruding toward the rear first housing 20A, in a predetermined area of an outer periphery. The protrusion 42 is formed with a detected portion 44 protruding toward the rear first housing 20A.

As shown in FIG. 3, the detected portion 44 is pressed against an actuator unit of the first sensor S1 in a case where the rotation position of the second housing 30 is in the first rotation position. Thereby, the first sensor S1 detects that the rotation position of the second housing 30 is in the first rotation position. In contrast, as shown in FIG. 4, the detected portion 44 is pressed against an actuator unit of the second sensor S2 in a case where the rotation position of the second housing 30 is in the second rotation position. Thereby, the second sensor S2 detects that the rotation position of the second housing 30 is in the second rotation position.

Note that, for the first sensor S1, any type of a sensor can be used as long as it can detect that the rotation position of the second housing 30 is in the first rotation position. Similarly, for the second sensor S2, any type of a sensor can be used as long as it can detect that the rotation position of the second housing 30 is in the second rotation position.

The reflecting mirror 14 is attached in an opposite position to an opening portion of the circular plate 40 in the front and back direction and in the upper and lower direction of the front main body 22B of the front first housing 20B. Note that, the reflecting mirror 14 is omitted in FIGS. 3 and 4. The same also applies to FIGS. 5, 7, 9 and 11, which will be described later.

Figure 5:
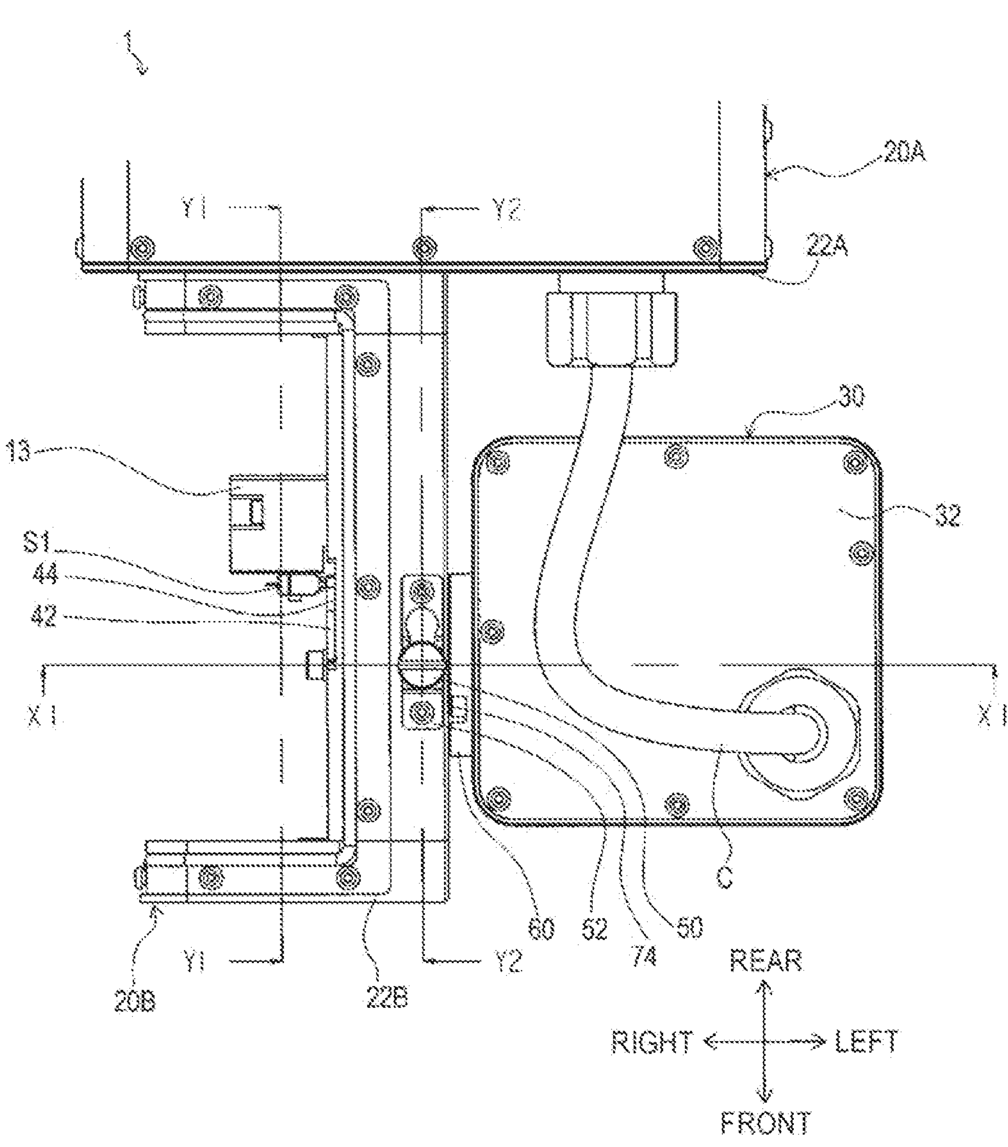
FIG. 5 is a plan view depicting a part of the laser marker.
Figure 6:
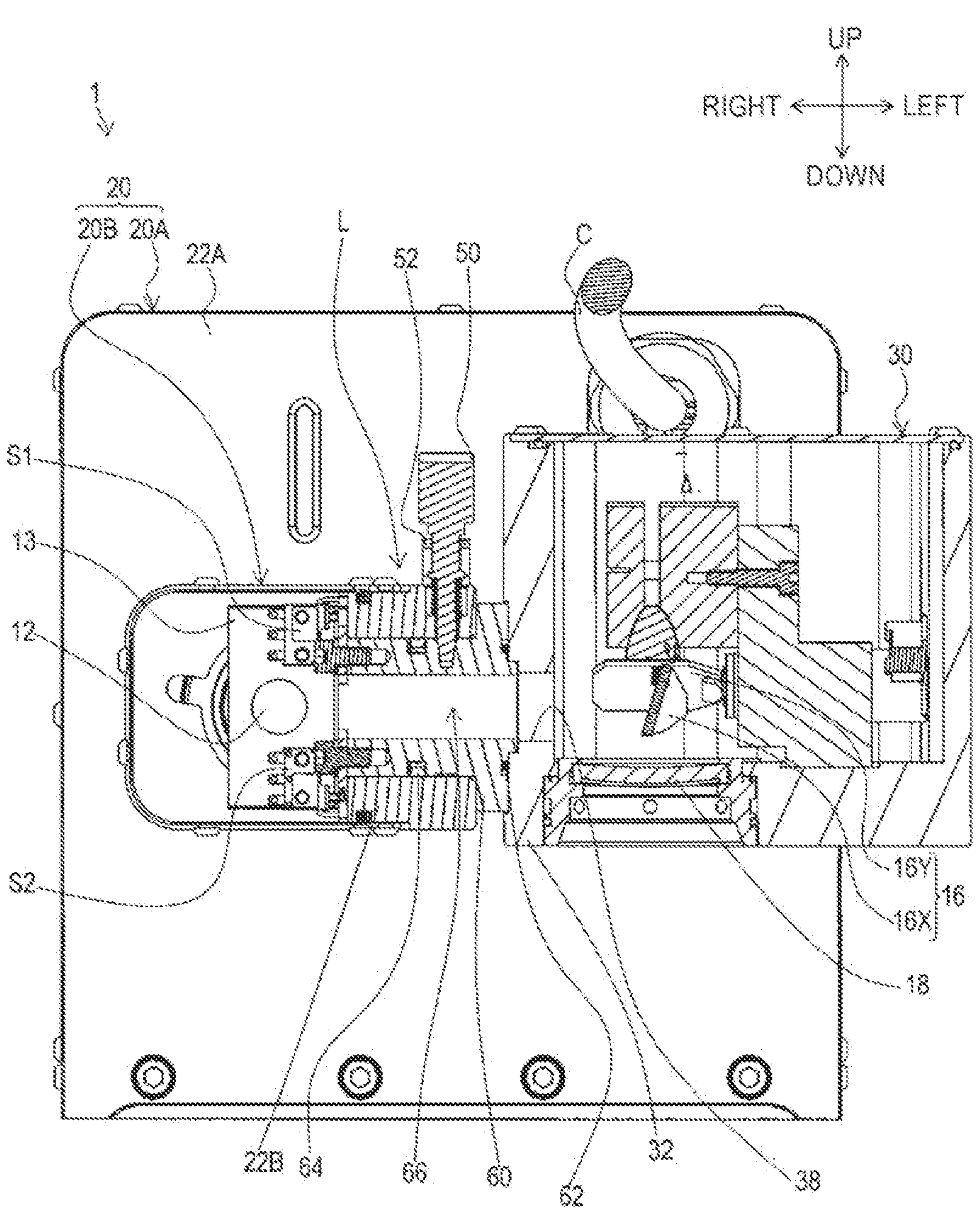
FIG. 6 is a sectional view of the laser marker taken along a line X1-X1 of FIG. 5.
Figure 7:
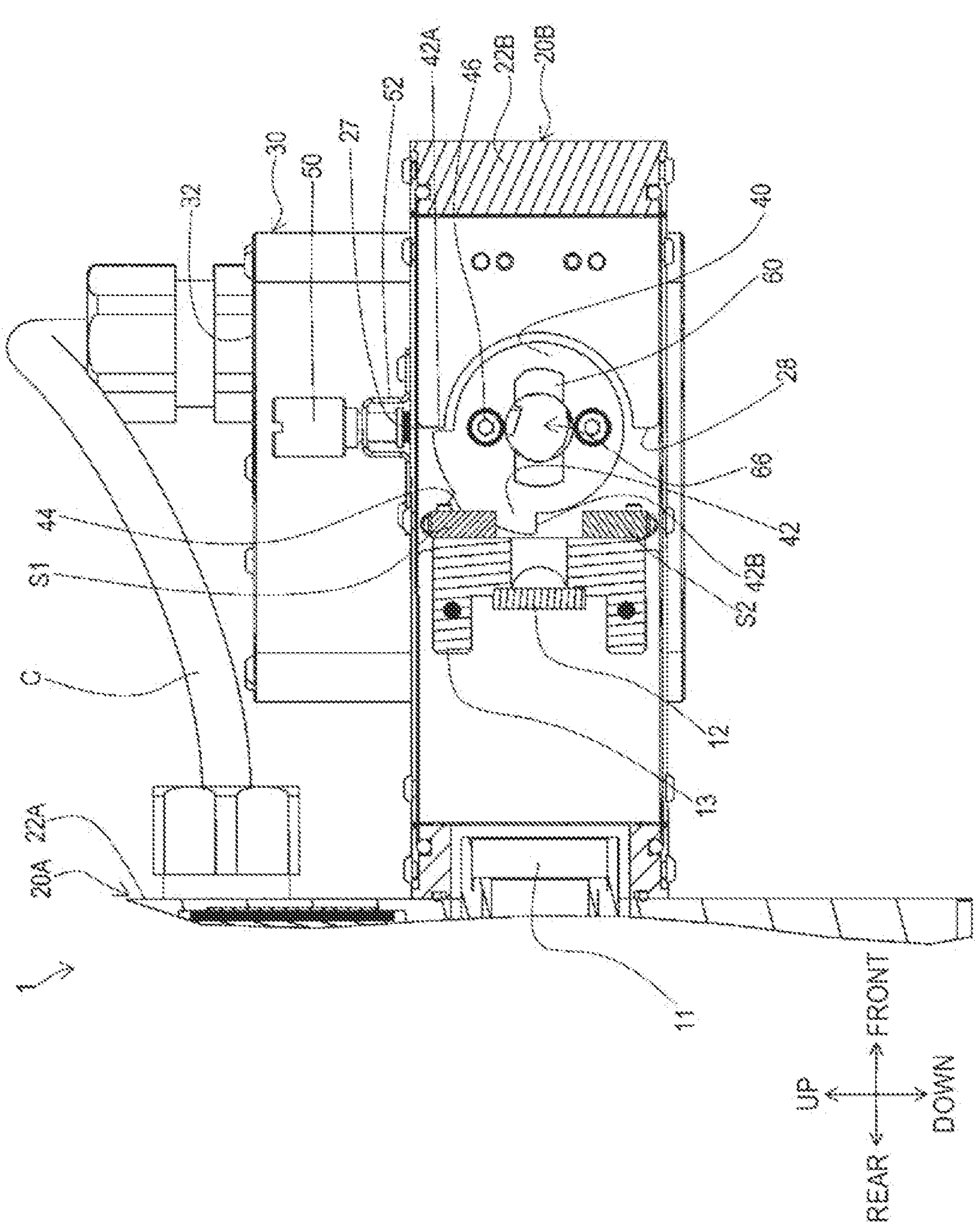
FIG. 7 is a sectional view of the laser marker taken along a line Y1-Y1 of FIG. 5.

FIGS. 5 to 8 depict a front part of the laser marker 1 of the present illustrative embodiment in the case where the rotation position of the second housing 30 is in the first rotation position. In FIGS. 5 to 7, the front cover 24B is removed from the front main body 22B.

As shown in FIGS. 5 to 7, the connecting member 60 has a substantially circular cylinder shape whose end faces face in the right and left direction, and is arranged over the front first housing 20B and the second housing 30. A left end of the connecting member 60 is fixed to the main body 32 of the second housing 30 via an O-ring 62 (refer to FIG. 6) by a screw 74 (refer to FIG. 5). In contrast, a right end of the connecting member 60 is attached with being inserted in the front main body 22B of the front first housing 20B via an X-ring 64 (refer to FIG. 6). Thereby, the connecting member 60 enables the second housing 30 to be rotatable with respect to the front first housing 20B. A right end face of the connecting member 60 is arranged in the front first housing 20B.

The circular plate 40 is fixed to the right end face of the connecting member 60 by a screw 46 (refer to FIG. 7). Thereby, the circular plate 40 is configured to rotate together with the second housing 30 via the connecting member 60. The protrusion 42 and the detected portion 44 protrude from an outer peripheral surface of the right end of the connecting member 60 away from a rotation center 68 (refer to FIG. 8) of the connecting member 60. In the front first housing 20B, an outer peripheral surface of the circular plate 40 and the protrusion 42 and the detected portion 44 protruding from the circular plate 40 further protrude to an outside of the connecting member 60 than an outer peripheral surface of the right end of the connecting member 60. Thereby, in the case where the second housing 30 is rotated with respect to the front first housing 20B, the connecting member 60 does not come off from the front first housing 20B. Note that, the protrusion 42 and the detected portion 44 may also protrude from the outer peripheral surface of the connecting member 60 away from the rotation center 68 of the connecting member 60, in the vicinity of the right end of the connecting member 60.

In addition, the circular plate 40, the protrusion 42, and the detected portion 44 are inscribed in the front first housing 20B. The left end of the connecting member 60 protrudes outward from the circular cylinder part of the connecting member 60, and is fixed with being sandwiched between the front main body 22B of the front first housing 20B and the main body 32 of the second housing 30. Thereby, the second housing 30 can rotate with respect to the front first housing 20B without being displaced in the right and left direction.

As shown in FIGS. 6 and 7, the connecting member 60 has a hollow structure 66 whose void is penetrated on both end faces thereof. The left void of the hollow structure 66 communicates with a through-hole 38 provided to the main body 32 of the second housing 30. In contrast, the right void of the hollow structure 66 communicates with the opening portion of the circular plate 40 in the front first housing 20B. Thereby, the laser light Q and the visible laser light R pass through the hollow structure 66 of the connecting member 60 after they are reflected on the reflecting mirror 14 in the front first housing 20B to be incident on the galvano scanner 16 in the second housing 30.

However, the hollow structure 66 is not limited to the tubular structure as along as it is a structure where the laser light Q and the visible laser light R pass from the front first housing 20B toward the second housing 30. Therefore, for example, the hollow structure 66 may have a structure where the void is exposed on side surfaces of the connecting member 60. In this case, however, the place where the void of the hollow structure 66 is exposed is shielded by the front main body 22B of the front first housing 20B or the main body 32 of the second housing 30.

Figure 8:
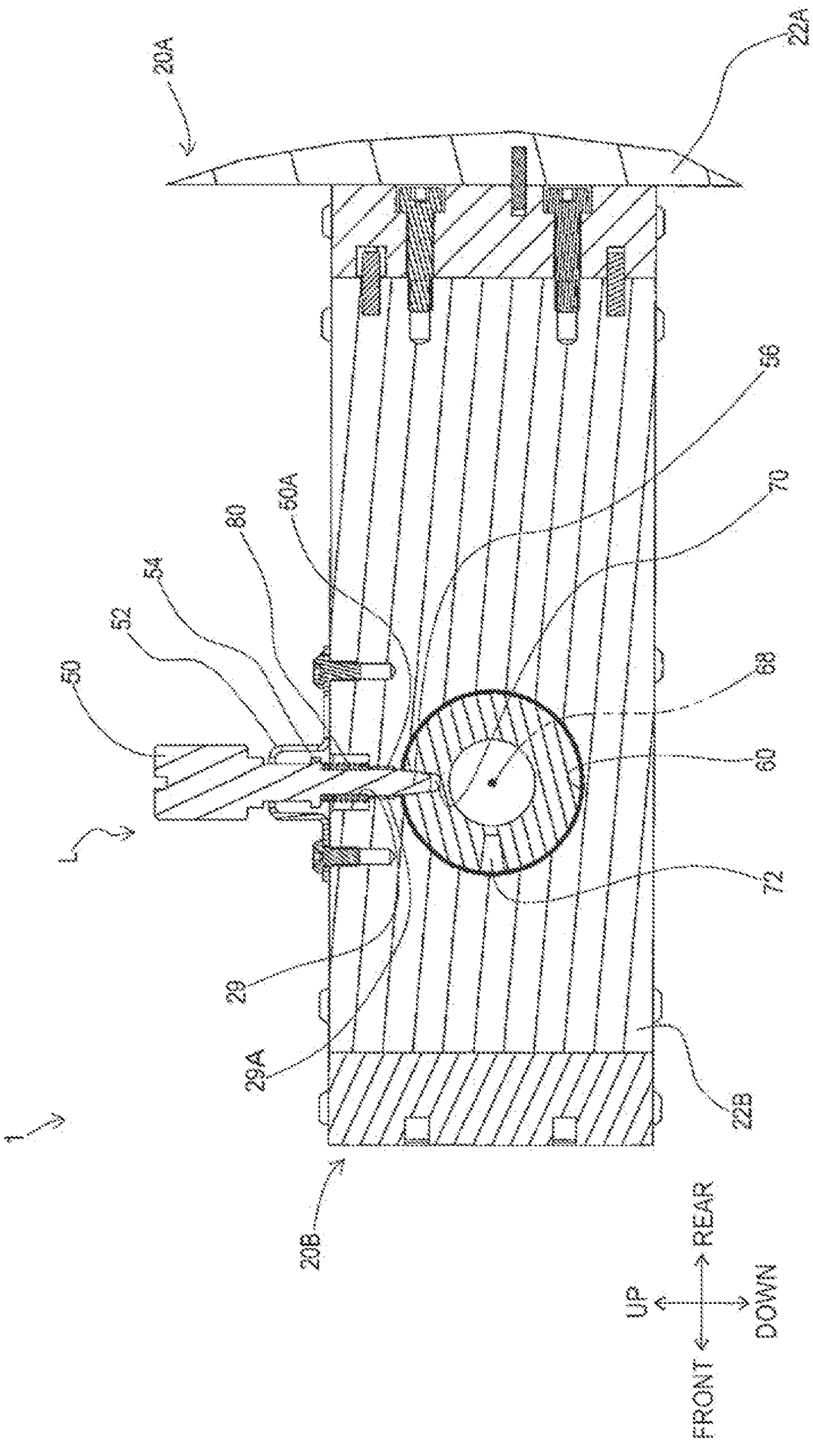
FIG. 8 is a sectional view of the laser marker taken along a line Y2-Y2 of FIG. 5.

As shown in FIG. 8, the lock mechanism L has a housing-side hole portion 29, a first hole portion 70, a second hole portion 72 and the like, in addition to the pin 50 and the attaching plate 52. The pin 50 has a collar portion 54 protruding outward from an outer peripheral surface of a shaft thereof. A tip end 56 of the pin 50 has a tapered shape. The shaft of the pin 50 is formed with a male screw 50A between the collar portion 54 and the tapered tip end 56.

The housing-side hole portion 29 penetrates up to a hole, in which the right end of the connecting member 60 is inserted, of the front main body 22B of the front first housing 20B, and has a stepped shape in the upper and lower direction. An inner diameter of the housing-side hole portion 29 is smaller on a lower end-side than an upper and-side. In addition, an inner peripheral surface of the lower end-side of the housing-side hole portion 29 is formed with a female screw 29A that is engaged with the male screw 50A of the pin 50.

The attaching plate 52 is attached with being convexly bent on the upper surface of the front main body 22B of the front first housing 20B. The pin 50 is inserted in the housing-side hole portion 29 with penetrating the attaching plate 52. Thereby, the collar portion 54 of the pin 50 is arranged between the upper end-side of the housing-side hole portion 29 and the attaching plate 52. In addition, a coil spring 80 in which the shaft of the pin 50 is inserted is arranged between the collar portion 54 of the pin 50 and the stepped surface of the housing-side hole portion 29. An upper end of the coil spring 80 is stopped by the collar portion 54 of the pin 50, and a lower end of the coil spring 80 is stopped by the stepped surface of the housing-side hole portion 29. For this reason, the pin 50 is urged upward. However, in a case where the pin 50 is moved upward, the collar portion 54 is butted against the attaching plate 52. Thereby, the pin 50 is prevented from coming off from the attaching plate 52.

The first hole portion 70 and the second hole portion 72 are provided to the connecting member 60. The first hole portion 70 and the second hole portion 72 are each formed such that an inner diameter thereof gradually decreases inward, thereby enabling guiding and fitting of the tip end 56 of the tapered pin 50. Therefore, the inner diameters of the first hole portion 70 and the second hole portion 72 are preferably formed to gradually decrease inward in a predetermined depth area where at least the first hole portion 70 and the second hole portion 72 can guide and fit the tip end 56 of the pin 50.

The first hole portion 70 and the second hole portion 72 are each formed from the outer peripheral surface of the connecting member 60 toward the rotation center 68 of the connecting member 60, as seen in a direction (right and left direction) in which the right end of the connecting member 60 is inserted in the front first housing 20B. In addition, a direction (upper and lower direction, in FIG. 8) from the first hole portion 70 toward the rotation center 68 of the connecting member 60 and a direction (right and left direction, in FIG. 8) from the second hole portion 72 toward the rotation center 68 of the connecting member 60 intersect at 90 degrees.

Note that, in a case where the first sensor S1 and the second sensor S2 are seen in a direction (right and left direction) in which the front first housing 20B and the second housing 30 are arranged, a direction from the actuator unit of the first sensor S1 toward the rotation center 68 of the second housing 30 and a direction from the actuator unit of the second sensor S2 toward the rotation center 68 of the second housing 30 intersect at 90 degrees.

In the case where the rotation position of the second housing 30 is in the first rotation position, the housing-side hole portion 29 of the front first housing 20B and the first hole portion 70 of the connecting member 60 communicate with each other. In this case, when the pin 50 is pushed downward against the urging force of the coil spring 80 and is turned in a predetermined direction, the tip end 56 of the pin 50 protrudes downward from the housing-side hole portion 29 and is fitted in the first hole portion 70. Thereby, the second housing 30 is fixed in the first rotation position. At this time, though the pin 50 is urged upward by the coil spring 80, the male screw 50A of the pin 50 and the female screw 29A of the housing-side hole portion 29 are fitted with each other, so that the tip end 56 of the pin 50 is prevented from coming off from the first hole portion 70.

In contrast, in a case where the pin 50 is turned in an opposite direction to the predetermined direction, the male screw 50A of the pin 50 separates from the female screw 29A of the housing-side hole portion 29 and the tip end 56 of the pin 50 comes off from the first hole portion 70. At this time, the pin 50 is moved upward by the urging force of the coil spring 80 and is thus separated from the connecting member 60, and the tip end 56 of the pin 50 is moved to a position in which the pin comes off from the first hole portion 70. Thereby, the fixed state of the second housing 30 in the first rotation position is released.

As shown in FIG. 7, the front main body 22B of the front first housing 20B is provided therein with a first wall surface part 27 on a further upward side than the circular plate 40 and a second wall surface part 28 on a further downward side than the circular plate 40. In contrast, the circular plate 40 is formed with a first end face part 42A and a second end face part 42B of the protrusion 42 by a step between an outer peripheral surface of the circular plate 40 and an outer peripheral surface of the protrusion 42.

For this reason, in a case where the circular plate 40 fixed to the right end face of the connecting member 60 is rotated together with the second housing 30, the first end face part 42A of the circular plate 40 is butted against the first wall surface part 27 of the front first housing 20B or the second end face part 42B of the circular plate 40 is butted against the second wall surface part 28 of the front first housing 20B. Thereby, a rotating range of the second housing 30 is limited. In FIG. 7, the first end face part 42A of the circular plate 40 is butted against the first wall surface part 27 of the front first housing 20B. In such a state, the rotation position of the second housing 30 is in the first rotation position.

Figure 9:
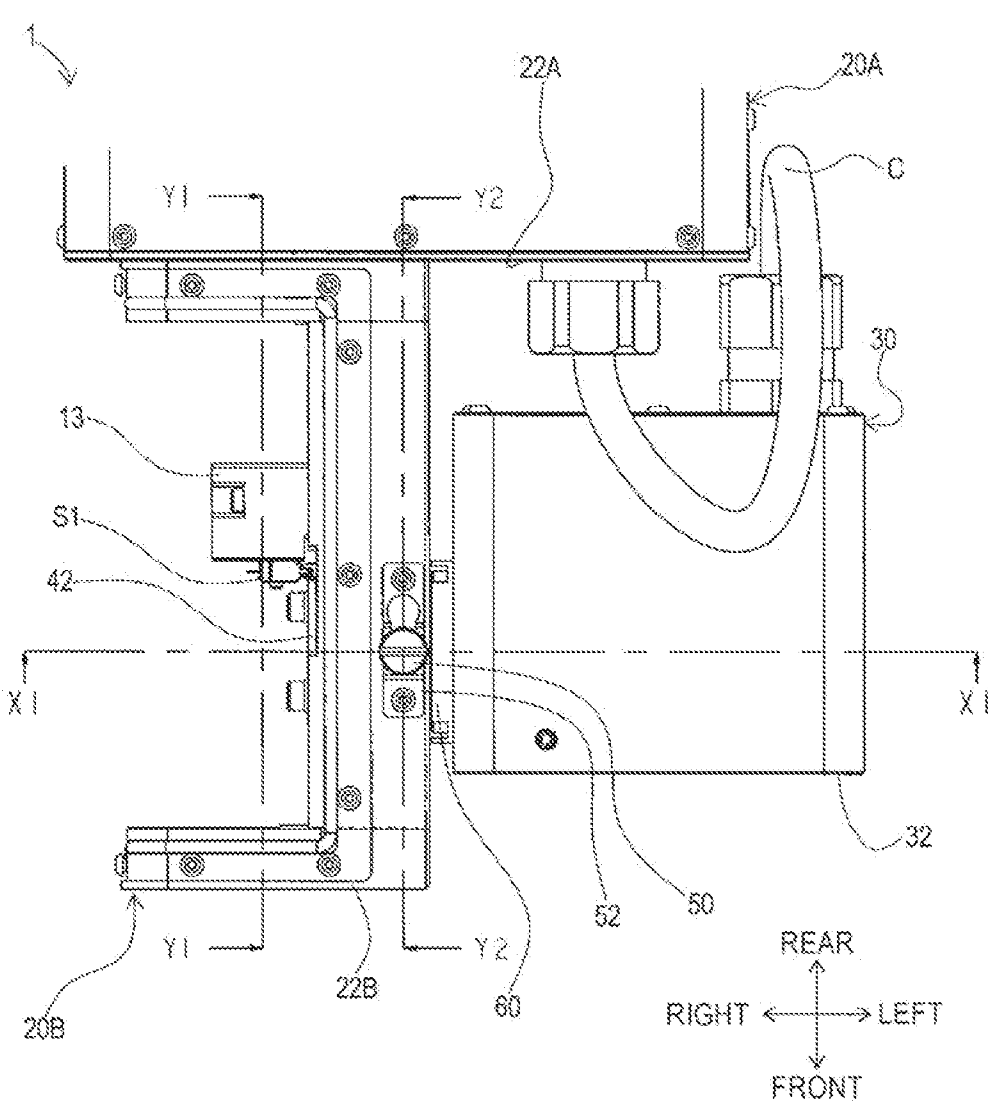
FIG. 9 is a plan view depicting a part of the laser marker shown in FIG. 4.
Figure 10:
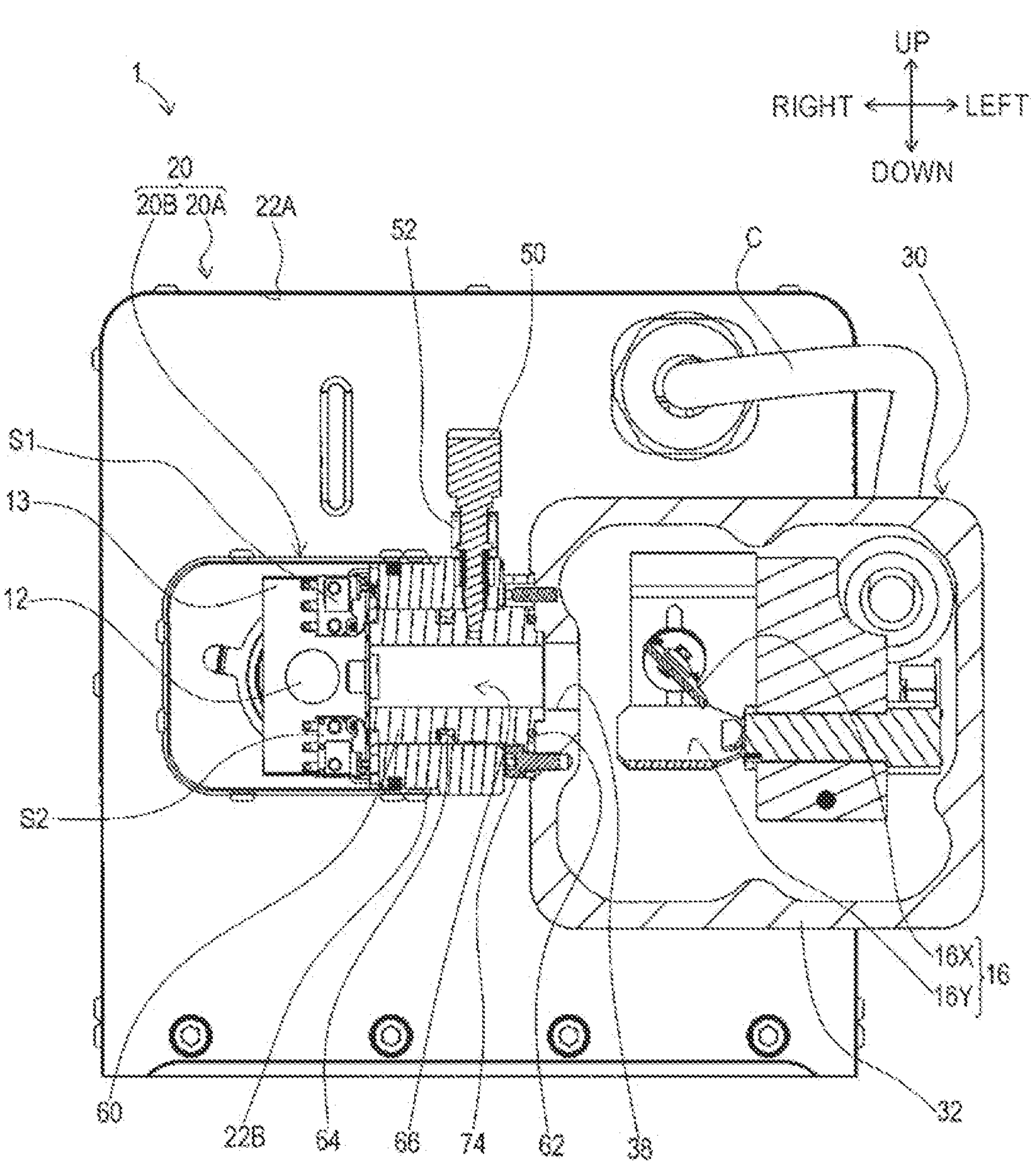
FIG. 10 is a sectional view of the laser marker taken along a line X1-X1 of FIG. 9.
Figure 11:
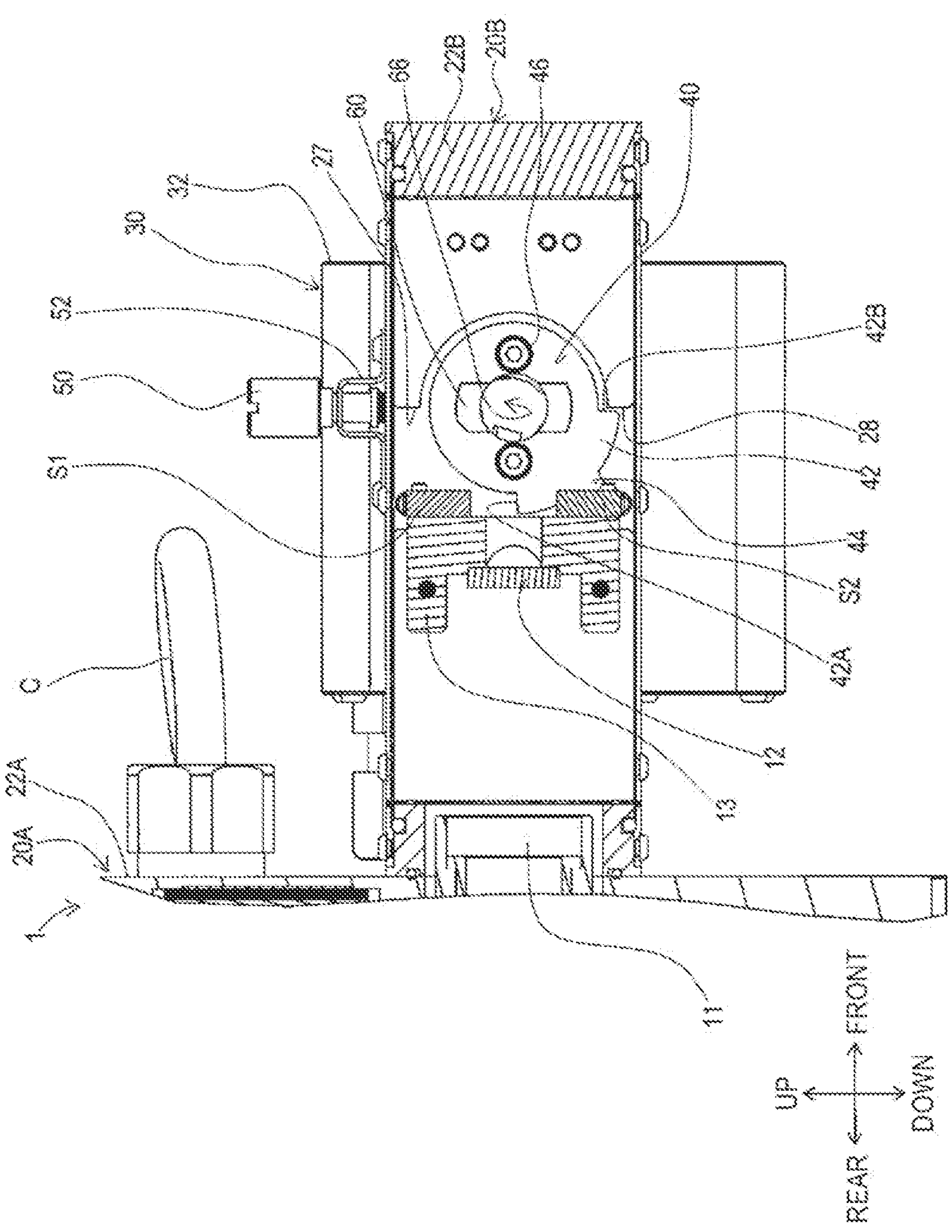
FIG. 11 is a sectional view of the laser marker taken along a line Y1-Y1 of FIG. 9.

FIGS. 9 to 12 depict a front part of the laser marker 1 of the present illustrative embodiment in a state when the rotation position of the second housing 30 is in the second rotation position. In FIGS. 9 to 11, the front cover 24B is removed from the front main body 22B. Note that, FIGS. 9 to 12 correspond to FIGS. 5 to 8 where the rotation position of the second housing 30 is in the first rotation position. For this reason, in the following descriptions, the matters that are common to the state where the rotation position of the second housing 30 is in the first rotation position are omitted.

As shown in FIG. 11, in a case where the second end face part 42B of the circular plate 40 is butted against the second wall surface part 28 of the front first housing 20B, the rotation position of the second housing 30 is in the second rotation position.

Figure 12:
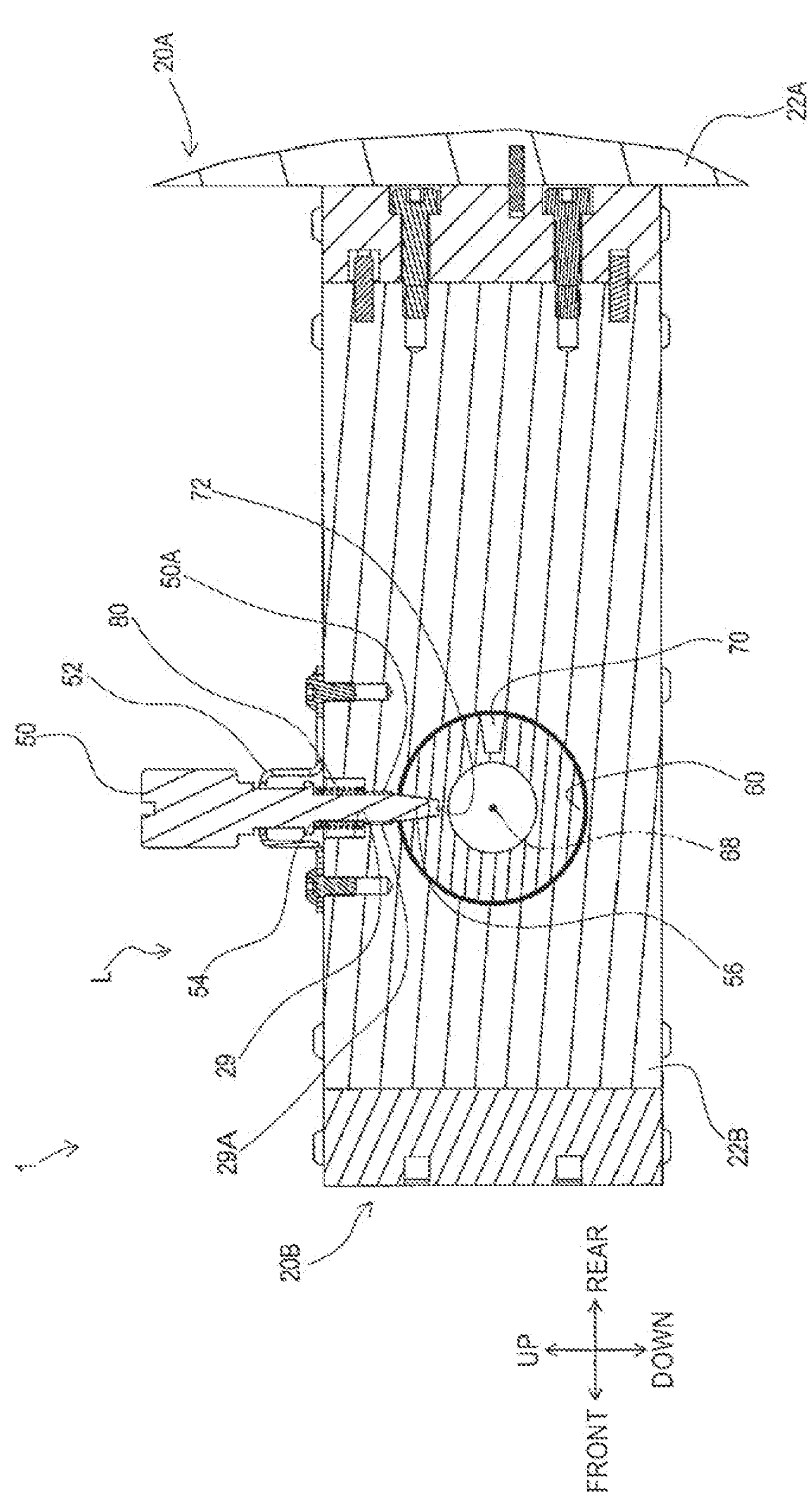
FIG. 12 is a sectional view of the laser marker taken along a line Y2-Y2 of FIG. 9.

In the state where the rotation position of the second housing 30 is in the second rotation position, as shown in FIG. 12, the housing-side hole portion 29 of the front first housing 20B and the second hole portion 72 of the connecting member 60 communicate with each other. In this case, when the pin 50 is pushed downward against the urging force of the coil spring 80 and is turned in a predetermined direction, the tip end 56 of the pin 50 protrudes downward from the housing-side hole portion 29 and is fitted in the second hole portion 72. Thereby, the second housing 30 is fixed in the second rotation position. At this time, though the pin 50 is urged upward by the coil spring 80, the male screw 50A of the pin 50 and the female screw 29A of the housing-side hole portion 29 are fitted with each other, so that the tip end 56 of the pin 50 is prevented from coming off from the first hole portion 70.

In contrast, in a case where the pin 50 is turned in an opposite direction to the predetermined direction, the male screw 50A of the pin 50 separates from the female screw 29A of the housing-side hole portion 29 and the tip end 56 of the pin 50 comes off from the first hole portion 70. At this time, the pin 50 is moved upward by the urging force of the coil spring 80 and is thus separated from the connecting member 60, and the tip end 56 of the pin 50 is moved to a position in which the pin comes off from the second hole portion 72. Thereby, the fixed state of the second housing 30 in the second rotation position is released.

By the above configuration, the first wall surface part 27 and the second wall surface part 28 provided to the front main body 22B of the front first housing 20B are butted against the first end face part 42A or the second end face part 42B of the protrusion 42 as the connecting member 60 is rotated together with the second housing 30, thereby limiting the rotating range of the second housing 30 between the first rotation position and the second rotation position. In addition, the first hole portion 70 of the connecting member 60 corresponds to the first rotation position, and the second hole portion 72 of the connecting member 60 corresponds to the second rotation position.

In this way, the lock mechanism L fixes the rotation of the connecting member 60 in the front first housing 20B, thereby fixing the second housing 30 to the first rotation position or the second rotation position.

Subsequently, an electrical configuration of the laser marker 1 of the present illustrative embodiment is described. As shown in FIG. 13, the laser marker 1 of the present illustrative embodiment is constituted by a print information preparation unit 2 and a laser processing unit 3. First, an electrical configuration of the print information preparation unit 2 is described. The print information preparation unit 2 includes an input operation unit 101, a control unit 103, a CD-R/W 113, a liquid crystal monitor (LCD) 115, and the like. The control unit 103 is connected to the input operation unit 101, the CD-R/W 113, the liquid crystal monitor 115 and the like via an input/output interface which is not shown.

The input operation unit 101 is constituted by a mouse, a keyboard and the like (not shown), and is used in a case where a user designates any one of the first rotation position and the second rotation position, as the rotation position of the second housing 30, for example.

The CD-R/W 113 is configured to read out or to write various data, application software and the like from or to a CD-ROM 117.

The control unit 103 is configured to control the entire print information preparation unit 2, and includes a CPU 105, a RAM 107, a ROM 109, a hard disk drive (hereinbelow, referred to as "HDD") 111, and the like. The CPU 105 is an arithmetic device and a control device configured to control the entire print information preparation unit 2. The CPU 105, the RAM 107, and the ROM 109 are connected to each other via bus lines (not shown), and are configured to mutually transmit and receive data. The CPU 105 and HDD 111 are also connected to each other via an input/output interface (not shown), and are configured to mutually transmit and receive data.

The RAM 107 is configured to temporarily store a variety of calculation results and the like calculated by the CPU 105. The ROM 109 is configured to store diverse programs and the like. In the HDD 111, programs of diverse application software, diverse data files, and the like are stored.

Subsequently, an electrical configuration of the laser processing unit 3 is described. The laser processing unit 3 includes a controller 201, a galvano driver 213, a semiconductor laser driver 215, the first sensor S1, the second sensor S2, a power supply unit for 24V DC/DC (24VDCDC) 217, and the like.

The controller 201 is configured to control the entire laser processing unit 3. The controller 201 is electrically connected to the galvano driver 213, the semiconductor laser driver 215, the first sensor S1, the second sensor S2, the power supply unit for 24V DC/DC 217, and the like. The controller 201 is connected to the print information preparation unit 2 such that interactive communication can be performed, and is configured to receive each information (for example, print information, control parameters on the laser processing unit 3, a variety of instruction information from the user, and the like) transmitted from the print information preparation unit 2.

Note that, the diverse instruction information from the user includes designation information indicating a result that the user designates, as the rotation position of the second housing 30, the first rotation position or the second rotation position.

The controller 201 includes a CPU 203, a RAM 205, a ROM 207, an FPGA (Field-Programmable Gate Array) 211, and the like. The CPU 203 is an arithmetic device and a control device configured to control the entire laser processing unit 3. The CPU 203, the RAM 205, the ROM 207, and the FPGA 211 are mutually connected by bus lines (not shown) to mutually transmit and receive data. The RAM 205 is to temporarily store a variety of calculation results calculated by the CPU 203, XY coordinate data of a print pattern, and the like.

The ROM 207 is configured to store a variety of programs, and for example, stores a program configured to calculate XY coordinate data of a print pattern, based on print information transmitted from the print information preparation unit 2, and to store the same in the RAM 205. Note that, the diverse programs include, for example, a program configured to store, in the RAM 205, a variety of control parameters indicative of a thickness, a depth and a number of a print pattern corresponding to print information input from the print information preparation unit 2, a speed of scanning the laser light Q by the galvano scanner 16, and the like, in addition to the above program. In the ROM 207, data such as a start point, an end point, a focus, a curvature and the like of a font of each of linear and elliptical characters is stored for each type of fonts.

The CPU 203 is configured to perform diverse calculations and controls, based on the diverse programs stored in the ROM 207.

The CPU 203 is configured to calculate XY coordinate data of a print pattern and galvano scanning speed information indicative of a speed of scanning the laser light Q by the galvano scanner 16, based on the print information input from the print information preparation unit 2. The CPU 203 is also configured to calculate drive angles, rotating speeds and the like of the galvano X-axis motor 17X and the galvano Y-axis motor 17Y, based on the diverse information (for example, the XY coordinate data of the print pattern, the galvano scanning speed information, and the like) and to output motor drive information indicative of the drive angles and rotating speeds to the galvano driver 213.

The galvano driver 213 is configured to drive control the galvano X-axis motor 17X and the galvano Y-axis motor 17Y, based on the motor drive information input from the controller 201, to scan two dimensionally the laser light Q and the visible laser light R.

The CPU 203 is configured to output an on-signal or an off-signal for instructing lighting or lights-out of the visible semiconductor laser 19 to the semiconductor laser driver 215. The semiconductor laser driver 215 is configured to turn on or turn off the visible semiconductor laser 19, based on the on-signal or the off-signal input from the controller 201.

The FPGA 211 is embedded in the controller 201, and is electrically connected to the galvano driver 213, the semiconductor laser driver 215, the first sensor S1, the second sensor S2, the power supply unit for 24V DC/DC 217, and the like. The power supply unit for 24V DC/DC 217 is electrically connected to a safety relay unit (hereinbelow, referred to as "SRU") 219 having a manual reset motor. Thereby, the SRU 219 can receive power from the power supply unit for 24V DC/DC 217. The SRU 219 is electrically connected to a DC power relay (DCPR) 221. The DC power relay 221 is wired between the laser supplying power source 223 and the laser unit 10. The laser supplying power source 223 is to supply power to the laser unit 10.

When the FPGA 211 turns off the power supply unit for 24V DC/DC 217 to cut off power supplying to the SRU 219, the SRU 219 opens a contact point of the DC power relay 221. For this reason, the power cannot be supplied to the laser unit 10 by the laser supplying power source 223. At this time, in a case where a manual reset mode of the SRU 219 is set, the SRU 219 does not perform self-recovery.

In contrast, in a case where the FPGA 211 turns on the power supply unit for 24V DC/DC 217 to execute power supplying to the SRU 219, the SRU 219 executes manual reset and closes the contact point of the DC power relay 221. For this reason, the power can be supplied to the laser unit 10 by the laser supplying power source 223.

The constitutional elements of the laser processing unit 3 are accommodated in the first housing 20 or the second housing 30. Specifically, the galvano driver 213 is accommodated in the rear first housing 20A, and the galvano X-axis motor 17X and the galvano Y-axis motor 17Y are accommodated in the second housing 30. Note that, the galvano driver 213 and each of the motors 17X and 17Y are electrically connected to each other by the cable C.

A logic indicated by a truth table 225 of FIG. 14 is incorporated in the FPGA 211.

In a "first sensor" column of the truth table 225, "1" indicates that the contact point of the first sensor S1 is closed. The contact point of the first sensor S1 is closed in a case where the detected portion 44 is pressed against the actuator unit of the first sensor S1. In this case, the first sensor S1 outputs, as a detection signal, an on-signal indicating that the rotation position of the second housing 30 is in the first rotation position. The output on-signal is input to the FPGA 211. In contrast, "0" indicates that the contact point of the first sensor S1 is opened. The contact point of the first sensor S1 is opened in a case where the detected portion 44 separates from the actuator unit of the first sensor S1. In this case, the on-signal is not output from the first sensor S1, and an off-signal indicating that the rotation position of the second housing 30 is not in the first rotation position is output as a detection signal. The output off-signal is input to the FPGA 211.

In a "second sensor" column of the truth table 225, "1" indicates that the contact point of the second sensor S2 is closed. The contact point of the second sensor S2 is closed in a case where the detected portion 44 is pressed against the actuator unit of the second sensor S2.

In this case, the second sensor S2 outputs, as a detection signal, an on-signal indicating that the rotation position of the second housing 30 is in the second rotation position. The output on-signal is input to the FPGA 211. In contrast, "0" indicates that the contact point of the second sensor S2 is opened. The contact point of the second sensor S2 is opened in a case where the detected portion 44 separates from the actuator unit of the second sensor S2. In this case, the on-signal is not output from the second sensor S2, and an off-signal indicating that the rotation position of the second housing 30 is not in the second rotation position is output as a detection signal. The output off-signal is input to the FPGA 211.

In a "sensor state" column of the truth table 225, "0 degree" indicates that it is detected by both the sensors S1 and S2 that the rotation position of the second housing 30 is in the first rotation position. That is, in a combination where the "first sensor" and "second sensor" columns are "1" and "0", since the on-signal of the first sensor S1 and the off-signal of the second sensor S2 are input to the FPGA 211, it is detected by both the sensors S1 and S2 that the rotation position of the second housing 30 is in the first rotation position. For this reason, "0 degree" is denoted in the "sensor state" corresponding to this case. Also, "ON" is denoted in a "24VDCDC" column corresponding to this case. "ON" indicates that the power supply unit for 24V DC/DC 217 becomes on. That is, in this case, the FPGA 211 outputs a signal for turning on the power supply unit for 24V DC/DC 217. The output signal is input to the power supply unit for 24V DC/DC 217. Thereby, the power supply unit for 24V DC/DC 217 becomes on, so that power can be supplied to the laser unit 10.

In the "sensor state" column of the truth table 225, "90 degrees" indicates that it is detected by both the sensors S1 and S2 that the rotation position of the second housing 30 is in the second rotation position. That is, in a combination where the "first sensor" and "second sensor" columns are "0" and "1", since the off-signal of the first sensor S1 and the on-signal of the second sensor S2 are input to the FPGA 211, it is detected by both the sensors S1 and S2 that the rotation position of the second housing 30 is in the second rotation position. For this reason, "90 degrees" is denoted in the "sensor state" corresponding to this case. Also, "ON" is denoted in the "24VDCDC" column corresponding to this case. "ON" indicates that the power supply unit for 24V DC/DC 217 becomes on. That is, in this case, the FPGA 211 outputs a signal for turning on the power supply unit for 24V DC/DC 217. The output signal is input to the power supply unit for 24V DC/DC 217. Thereby, the power supply unit for 24V DC/DC 217 becomes on, so that power can be supplied to the laser unit 10.

The output of the FPGA 211 is performed, on condition that the rotation position of the second housing 30 detected by both the sensors S1 and S2 matches the rotation position of the second housing 30 designated from the input operation unit 101 by the user.

Note that, when the signal for turning on the power supply unit 217 for 24V DC/DC is output, i.e., when the "first sensor" and "second sensor" columns in the truth table 225 is a combination of "1" and "0", in a case where the "first sensor" and "second sensor" columns is a combination of "0" and "1", the FPGA 211 outputs a signal to allow drive control of the galvano X-axis motor 17X and the galvano Y-axis motor 17Y to the galvano driver 213, and also outputs a signal to allow lighting of the visible semiconductor laser 19 to the semiconductor laser driver 215.

That is, in a case where the rotation position of the second housing 30 is in the first rotation position or the second rotation position, the power can be supplied to the laser unit 10, each of the motors 17X and 17Y of the galvano scanner 16 can be drive-controlled, and the visible semiconductor laser 19 can be turned on.

In contrast, in the "sensor state" column of the truth table 225, "under rotation" indicates that it is detected by both the sensors S1 and S2 that the rotation position of the second housing 30 is between the first rotation position and the second rotation position. That is, in a combination where the "first sensor" and "second sensor" columns are "0" and "0", since the off-signal of the first sensor S1 and the off-signal of the second sensor S2 are input to the FPGA 211, it is detected by both the sensors S1 and S2 that the rotation position of the second housing 30 is between the first rotation position and the second rotation position. For this reason, "under rotation" is denoted in the "sensor state" column corresponding to this case. Also, "OFF" is denoted in the "24VDCDC" column corresponding to this case. "OFF" indicates that the power supply unit for 24V DC/DC 217 becomes off. That is, in this case, the FPGA 211 outputs a signal for turning off the power supply unit for 24V DC/DC 217. The output signal is input to the power supply unit for 24V DC/DC 217. Thereby, the power supply unit for 24V DC/DC 217 becomes off, so that power cannot be supplied to the laser unit 10.

In the "sensor state" column of the truth table 225, "NA" indicates that the detection signals of both the sensors S1 and S2 are not valid. That is, in a combination where the "first sensor" and "second sensor" columns are "1" and "1", the on-signal of the first sensor S1 and the on-signal of the second sensor S2 are input to the FPGA 211. However, since it is difficult for the detected portion 44 to be pressed against each actuator unit of both the sensors S1 and S2 at the same time, it is assumed that the detection signals of both the sensors S1 and S2 are not valid. For this reason, "NA" is denoted in the "sensor state" column corresponding to this case. Also, "NA" is denoted in the "24VDCDC" column corresponding to this case. As described above, "NA" indicates that the detection signals of both the sensors S1 and S2 are not valid. However, in this case, the FPGA 211 outputs a signal to turn off the power supply unit for 24V DC/DC 217, in a similar manner to the above "OFF" case. The output signal is input to the power supply unit for 24V DC/DC 217. Thereby, the power supply unit for 24V DC/DC 217 becomes off, so that the power cannot be supplied to the laser unit 10.

Note that, in a case where the signal for turning off the power supply unit for 24V DC/DC 217 is output, i.e., in a case where the "first sensor" and "second sensor" columns in the truth table 225 is a combination of "0" and "0", in a case where the "first sensor" and "second sensor" columns is a combination of "1" and "1", the FPGA 211 outputs a signal to stop drive control on the galvano X-axis motor 17X and the galvano Y-axis motor 17Y to the galvano driver 213, and also outputs an off-signal signal to instruct lights-out of the visible semiconductor laser 19 to the semiconductor laser driver 215.

Figure 15:
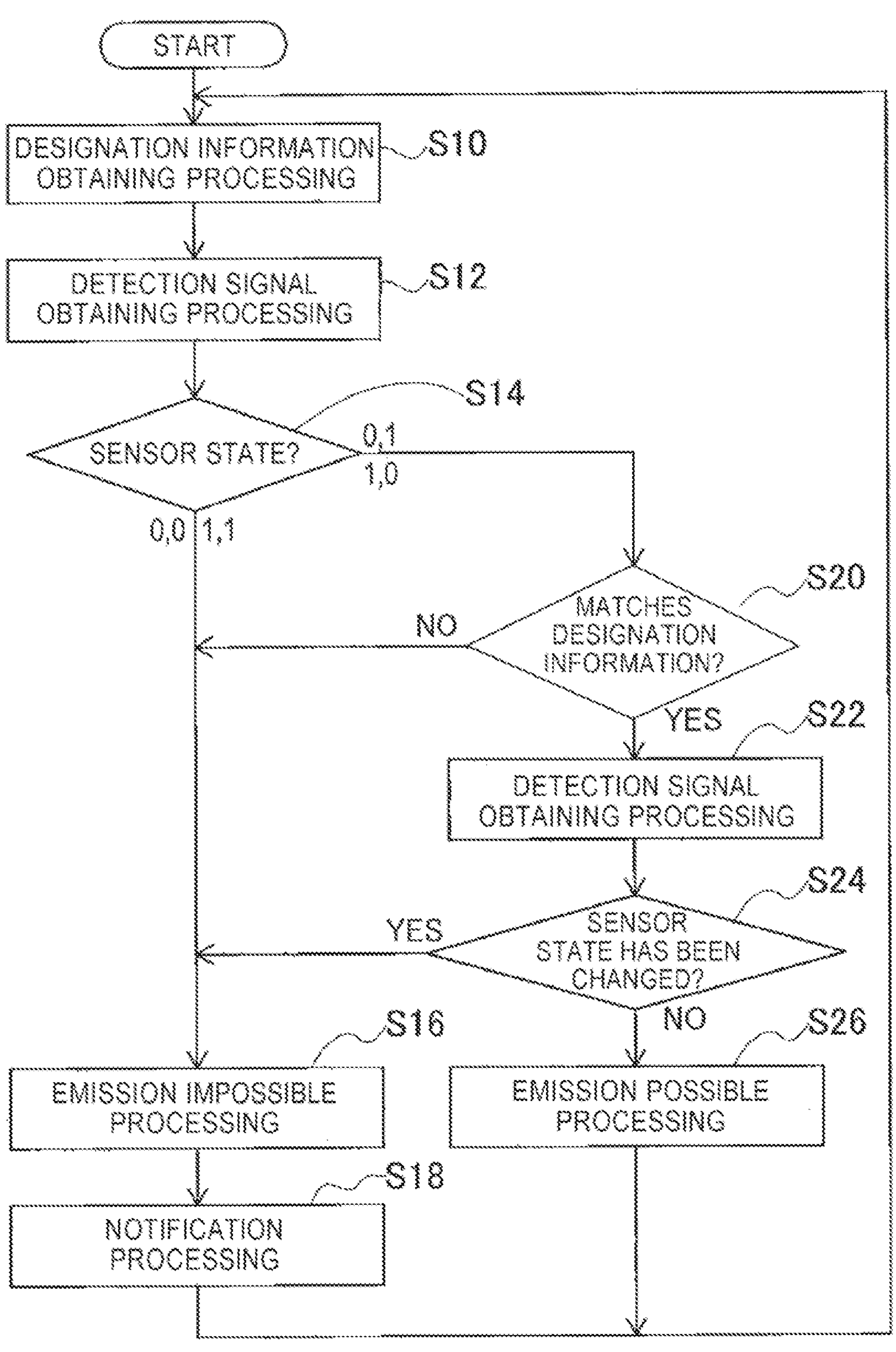
FIG. 15 is a flowchart depicting electrical operations of the laser marker.

That is, in a case where the rotation position of the second housing 30 is between the first rotation position and the second rotation position, or in a case where the detection signals of both the sensors S1 and S2 are not valid, the power cannot be supplied to the laser unit 10, the drive control on each of the motors 17X and 17Y of the galvano scanner 16 is stopped, and the visible semiconductor laser 19 is turned off. Note that, in this case, the power supplying to the galvano scanner 16 and the visible semiconductor laser 19 may also be cut off Subsequently, an emission control of the laser marker 1 of the present illustrative embodiment is described. An emission control program shown with a flowchart of FIG. 15 is stored in the ROM 207 of the controller 201, and is executed by the CPU 203 of the controller 201. The program is also executed as the power supply of the laser marker 1 becomes on. In the emission control program shown with the flowchart of FIG. 15, designation information obtaining processing is first executed in step (hereinbelow, simply denoted as "S") 10.

In this processing, designation information input from the print information preparation unit 2 to the controller 201 is obtained, and a designation result is specified based on the designation information. The designation result is a result indicating that the user designates, as the rotation position of the second housing 30, any one of the first rotation position or the second rotation position via the input operation unit 101. Note that, processing of a next step is not executed until the user's designation result is specified.

In a case where the user's designation result is specified, detection signal obtaining processing S12 is executed. In this processing, the detection result of the first sensor S1 and the detection result of the second sensor S2 are obtained. The detection results of both the sensors S1 and S2 are an on-signal or off-signal.

In a case where the detection signals of both the sensors S1 and S2 are obtained, sensor state determining processing S14 is executed. This determination is performed based on the detection signals of both the sensors S1 and S2.

In a case where the detection signals of both the sensors S1 and S2 are all the off-signals (S14; 0, 0), or in a case where the detection signals of both the sensors S1 and S2 are all the on-signals (S14; 1, 1), emission impossible processing S16 is executed. This processing is executed as the detection signals of both the sensors S1 and S2 are input to the FPGA 211. Thereby, in the laser marker 1 of the present illustrative embodiment, in a case where the rotation position of the second housing 30 is between the first rotation position and the second rotation position or in a case where the detection signals of both the sensors S1 and S2 are not valid, the power cannot be supplied to the laser unit 10, so that the laser light Q cannot be emitted to the outside of the second housing 30. In addition, in the laser marker 1 of the present illustrative embodiment, the drive control on each of the motors 17X and 17Y of the galvano scanner 16 is stopped and the visible semiconductor laser 19 is turned off In a case where the emission impossible processing S16 is executed, notification processing S18 is executed. In this processing, information is input from the controller 201 to the print information preparation unit 2, so that a message, which indicates that the rotation position of the second housing 30 is located in a position other than the first rotation position and the second rotation position, is displayed on the liquid crystal monitor 115. Thereby, it is notified to the user that the rotation position of the second housing 30 is located in a position other than the first rotation position and the second rotation position. Note that, the notification may also be performed by a sound of a speaker, light of a rotating lamp, or the like. Thereafter, the designation information obtaining processing S10 is again executed.

In contrast, in a case where the detection result of the first sensor S1 is the on-signal and the detection result of the second sensor S2 is the off-signal (S14; 1, 0), or in a case where the detection result of the first sensor S1 is the off-signal and the detection result of the second sensor S2 is the on-signal (S14; 0, 1), determination processing S20 of determining whether the sensor state matches the designation information is executed. This processing is executed, based on the detection signals of both the sensors S1 and S2 obtained in S12 and the designation result specified in S10. That is, it is determined whether the rotation position of the second housing 30 specified by the detection signals of both the sensors S1 and S2 matches the rotation position of the second housing 30 (any one of the first rotation position or the second rotation position) designated from the input operation unit 101 by the user.

In a case where it is determined that the sensor state does not match the designation information (S20: NO), i.e., the rotation position of the second housing 30 specified by the detection signals of both the sensors S1 and S2 does not match the rotation position of the second housing 30 designated from the input operation unit 101 by the user, the emission impossible processing S16 is executed. Thereby, in the laser marker 1 of the present illustrative embodiment, even in a case where the rotation position of the second housing 30 is in the first rotation position or the second rotation position, in a case where the rotation position of the second housing 30 does not match the rotation position designated by the user, the power cannot be supplied to the laser unit 10, the drive control on each of the motors 17X and 17Y of the galvano scanner 16 is stopped, and the visible semiconductor laser 19 is turned off Note that, in this case, information is input from the controller 201 to the print information preparation unit 2, so that a popup window for urging the user to designate the rotation position of the second housing 30 via the input operation unit 101 is displayed on the liquid crystal monitor 115.

In contrast, in a case where it is determined that the sensor state matches the designation information (S20: YES), i.e., the rotation position of the second housing 30 specified by the detection signals of both the sensors S1 and S2 matches the rotation position of the second housing 30 designated from the input operation unit 101 by the user, detection signal obtaining processing S22 is executed. This processing is similar to the detection signal obtaining processing S12.

In a case where the detection signal obtaining processing S22 is executed, determination processing S24 of determining whether the sensor state has been changed is executed. In this processing, it is determined whether the detection signals of both the sensors S1 and S2 obtained in the detection signal obtaining processing S22 match the detection signals of both the sensors S1 and S2 obtained in the detection signal obtaining processing S12.

In a case where the detection signals of both the sensors S1 and S2 obtained in both the detection signal obtaining processing S12 and S22 are not matched, the rotation position of the second housing 30 is different at the time of both the detection signal obtaining processing S12 and S22. Therefore, it is determined that the sensor state has been changed (S24: YES). In this case, the emission impossible processing S16 is executed. Thereby, in the laser marker 1 of the present illustrative embodiment, even in a case where the rotation position of the second housing 30 is in the first rotation position or the second rotation position and the rotation position of the second housing 30 matches the rotation position designated by the user, in a case where the rotation position of the second housing 30 is changed, the power cannot be supplied to the laser unit 10, the drive control on each of the motors 17X and 17Y of the galvano scanner 16 is stopped, and the visible semiconductor laser 19 is turned off In contrast, in a case where the detection signals of both the sensors S1 and S2 obtained in both the detection signal obtaining processing S12 and S22 are matched, the rotation position of the second housing 30 is the same at the time of both the detection signal obtaining processing S12 and S22. Therefore, it is determined that the sensor state has not been changed (S24: NO). In this case, emission possible processing S26 is executed. This processing is executed as the detection signals of both the sensors S1 and S2 are input to the FPGA 211. Thereby, in the laser marker 1 of the present illustrative embodiment, in a case where the rotation position of the second housing 30 is in the first rotation position or the second rotation position, the rotation position of the second housing 30 matches the rotation position designated by the user, and the rotation position of the second housing 30 is not changed, the power can be supplied to the laser unit 10, so that the laser light Q can be emitted to the outside of the second housing 30. In addition, in the laser marker 1 of the present illustrative embodiment, each of the motors 17X and 17Y of the galvano scanner 16 can be drive-controlled, and the visible semiconductor laser 19 can be turned on.

As described in detail above, according to the laser marker 1 of the present illustrative embodiment, in a case where the detection signals indicating that the rotation position of the second housing 30 is in the first rotation position or the second rotation position are output from both the sensors S1 and S2 (S14; 1, 0) (S14; 0, 1), the laser light Q can be emitted to the outside of the second housing 30 (S26). When the detection signals indicating that the rotation position of the second housing 30 is in the first rotation position or the second rotation position are not output from both the sensors S1 and S2 (S14; 0, 0) (S14; 1, 1), the laser light Q cannot be emitted to the outside of the second housing 30 (S16). Thereby, according to the laser marker 1 of the present illustrative embodiment, in a case where the second housing 30 in which the galvano scanner 16 configured to scan the laser light Q to the outside of the second housing 30 is accommodated is rotated and the rotation position of the second housing 30 is not in the first rotation position and the second rotation position, the laser light Q cannot be emitted to the outside of the second housing 30, so that it is possible to ensure safety.

In addition, according to the laser marker 1 of the present illustrative embodiment, in a case where the rotation position of the second housing 30 indicated by the designation information input via the input operation unit 101 matches the rotation position of the second housing 30 indicated by the detection signals output from both the sensors S1 and S2 (S20: YES), the laser light Q can be emitted to the outside of the second housing 30 (S26). In a case where the rotation position of the second housing 30 indicated by the designation information input via the input operation unit 101 is different from the rotation position of the second housing 30 indicated by the detection signals output from both the sensors S1 and S2 (S20: NO), the laser light Q cannot be emitted to the outside of the second housing 30 (S16). Thereby, the safety is ensured because the laser marker 1 of the present illustrative embodiment can prevent the laser light Q from being emitted from the second housing 30 in an unintended direction of the user.

Further, according to the laser marker 1 of the present illustrative embodiment, in a case where the rotation position of the second housing 30 is changed from one rotation position to the other rotation position of the first rotation position and the second rotation position (S20: YES) (S24: YES), the laser light Q cannot be emitted to the outside of the second housing 30 (S16). However, in a case where the designation information in which the other rotation position is designated as the rotation position of the second housing 30 is input by the input operation unit 101 (S20: YES) (S24: NO), the laser light Q can be emitted to the outside of the second housing 30 (S26). Thereby, in a case where the second housing 30 is rotated from the first rotation position or the second rotation position, the user is urged to check the direction of the laser light Q to be emitted from the second housing 30 by an input operation on the input operation unit 101. Therefore, the laser light Q is prevented from being emitted from the second housing 30 in an unintended direction of the user, so that the laser marker 1 of the present illustrative embodiment is safe.

In addition, according to the laser marker 1 of the present illustrative embodiment, in the case where it is detected only by one of the first sensor S1 and the second sensor S2 that the rotation position of the second housing 30 is in the first rotation position or the second rotation position (S14; 1, 0) (S14; 0, 1), the laser light Q can be emitted to the outside of the second housing 30 (S26). Also, in the case where it is not detected by both the first sensor S1 and the second sensor S2 that the rotation position of the second housing 30 is in the first rotation position or the second rotation position (S14; 0, 0), the laser light Q cannot be emitted to the outside of the second housing 30 (S16). Therefore, the laser marker 1 of the present illustrative embodiment is safe.

Further, according to the laser marker 1 of the present illustrative embodiment, in the case where it is detected by both the first sensor S1 and the second sensor S2 that the rotation position of the second housing 30 is in the first rotation position and the second rotation position (S14; 1, 1), the laser light Q cannot be emitted to the outside of the second housing 30 (S16). Therefore, the laser marker 1 of the present illustrative embodiment is safe.

In addition, according to the laser marker 1 of the present illustrative embodiment, in a case where the first sensor S1 and the second sensor S2 are seen in the direction (right and left direction) in which the front first housing 20B and the second housing 30 are aligned side by side, the direction from the actuator unit of the first sensor S1 toward the rotation center 68 of the second housing 30 and the direction from the actuator unit of the second sensor S2 toward the rotation center 68 of the second housing 30 are orthogonal to each other. For this reason, the laser marker 1 of the present illustrative embodiment is configured such that the emission direction of the laser light Q in the case where the second housing 30 is in the first rotation position and the emission direction of the laser light Q in the case where the second housing 30 is in the second rotation position are orthogonal to each other.

Further, according to the laser marker 1 of the present illustrative embodiment, in the case where the detection signals, which indicate that the rotation position of the second housing 30 is the first rotation position or the second rotation position, are output from both the sensors S1 and S2 (S14; 1, 0) (S14; 0, 1), the power can be supplied to the laser unit 10 (S26). Also, in a case where the detection signals, which indicate that the rotation position of the second housing 30 is the first rotation position or the second rotation position, are not output from both the sensors S1 and S2 (S14; 0, 0) (S14; 1, 1), the power cannot be supplied to the laser unit 10 (S16). Therefore, the laser marker 1 of the present illustrative embodiment is safe.

In addition, according to the laser marker 1 of the present illustrative embodiment, in the case where the detection signals, which indicate that the rotation position of the second housing 30 is the first rotation position or the second rotation position, are not output from both the sensors S1 and S2 (S14; 0, 0) (S14; 1, 1), the drive control on each of the motors 17X and 17Y of the galvano scanner 16 is stopped (S16). Thereby, according to the laser marker 1 of the present illustrative embodiment, even in a case where a noise occurs in the cable C of the galvano scanner 16 due to the rotation of the second housing 30, the drive control on each of the motors 17X and 17Y of the galvano scanner 16 is stopped during the rotation of the second housing 30, so that oscillation of the laser light Q by the galvano scanner 16 is prevented.

In addition, according to the laser marker 1 of the present illustrative embodiment, in a case where the detection signals, which indicate that the rotation position of the second housing 30 is the first rotation position or the second rotation position, are not output from both the sensors S1 and S2 (S14; 0, 0) (S14; 1, 1), the message indicating that the rotation position of the second housing 30 is in a position other than the first rotation position and the second rotation position is displayed on the liquid crystal monitor 115 (S18). Therefore, the laser marker 1 of the present illustrative embodiment is safe.

In addition, according to the laser marker 1 of the present illustrative embodiment, in a case where the detection signals, which indicate that the rotation position of the second housing 30 is the first rotation position or the second rotation position, are not output from both the sensors S1 and S2 (S14; 0, 0) (S14; 1, 1), the visible semiconductor laser 19 is turned off and the visible laser light R cannot be thus emitted to the outside of the second housing 30 (S16). Therefore, the laser marker 1 of the present illustrative embodiment is safe.

Further, according to the laser marker 1 of the present illustrative embodiment, the left end of the connecting member 60 is fixed to the main body 32 of the second housing 30, the right end of the connecting member 60 is attached with being inserted in the front main body 22B of the front first housing 20B, and the connecting member 60 connects the front first housing 20B and the second housing 30 each other, so that the second housing 30 can be rotated. Also, the detected portion 44 protrudes from the outer peripheral surface of the right end of the connecting member 60 away from the rotation center 68 of the connecting member 60, and is pressed against the actuator units of both the sensors S1 and S2 in a case where the rotation position of the second housing 30 is the first rotation position or the second rotation position. For this reason, since the actuator units are distant from the rotation center 68 of the connecting member 60, both the sensors S1 and S2 can be easily arranged in the front main body 22B of the front first housing 20B, and it is possible to accurately detect that the rotation position of the second housing 30 is in the first rotation position or the second rotation position.

Additionally describing, in the present illustrative embodiment, the laser unit 10 is an example of the "laser light source". The galvano scanner 16 is an example of the "scanner". The visible semiconductor laser 19 is an example of the "guide light source". The connecting member 60 is an example of the "connecting part". The left end of the connecting member 60 is an example of "one end of the connecting part". The right end of the connecting member 60 is an example of the "other end of the connecting part". The rotation center 68 of the connecting member 60 is an example of the "rotation center of the connecting part". The input operation unit 101 is an example of the "user interface". The liquid crystal monitor 115 is an example of the "notification device". The visible laser light R is an example of the "visible light". The first sensor S1 and the second sensor S2 are examples of the "sensor". The outside of the second housing 30 is an example of the "outside". The right and left direction is an example of the "direction in which the first housing and the second housing are aligned side by side. The direction from the actuator unit of the first sensor S1 toward the rotation center 68 of the second housing 30 is an example of the "first direction". The direction from the actuator unit of the second sensor S2 toward the rotation center 68 of the second housing 30 is an example of the "second direction".

Note that, the present disclosure is not limited to the present illustrative embodiment, and can be diversely changed without departing from the gist thereof. For example, as described above, the laser marker 1 of the present illustrative embodiment may be constituted by the print information preparation unit 2 and the laser processing unit 3, or may be constituted only by the laser processing unit 3.

In addition, the right end of the connecting member 60 may be fixed to the front main body 22B of the front first housing 20B, and the left end of the connecting member 60 may be rotatably inserted in the main body 32 of the second housing 30. In this case, however, the lock mechanism L fixes the rotation of the connecting member 60 in the second housing 30, thereby fixing the second housing 30 in the first rotation position or the second rotation position.

The connecting member 60 may also protrude from the main body 32 of the second housing 30 or the front main body 22B of the front first housing 20B.

The second housing 30 may also be provided on a forward side of the front first housing 20B. In this case, the second housing 30 is arranged on a light path of the laser light Q and the visible laser light R traversing the inside of the front first housing 20B. For this reason, the reflecting mirror 14 is not required.

Figure 16:
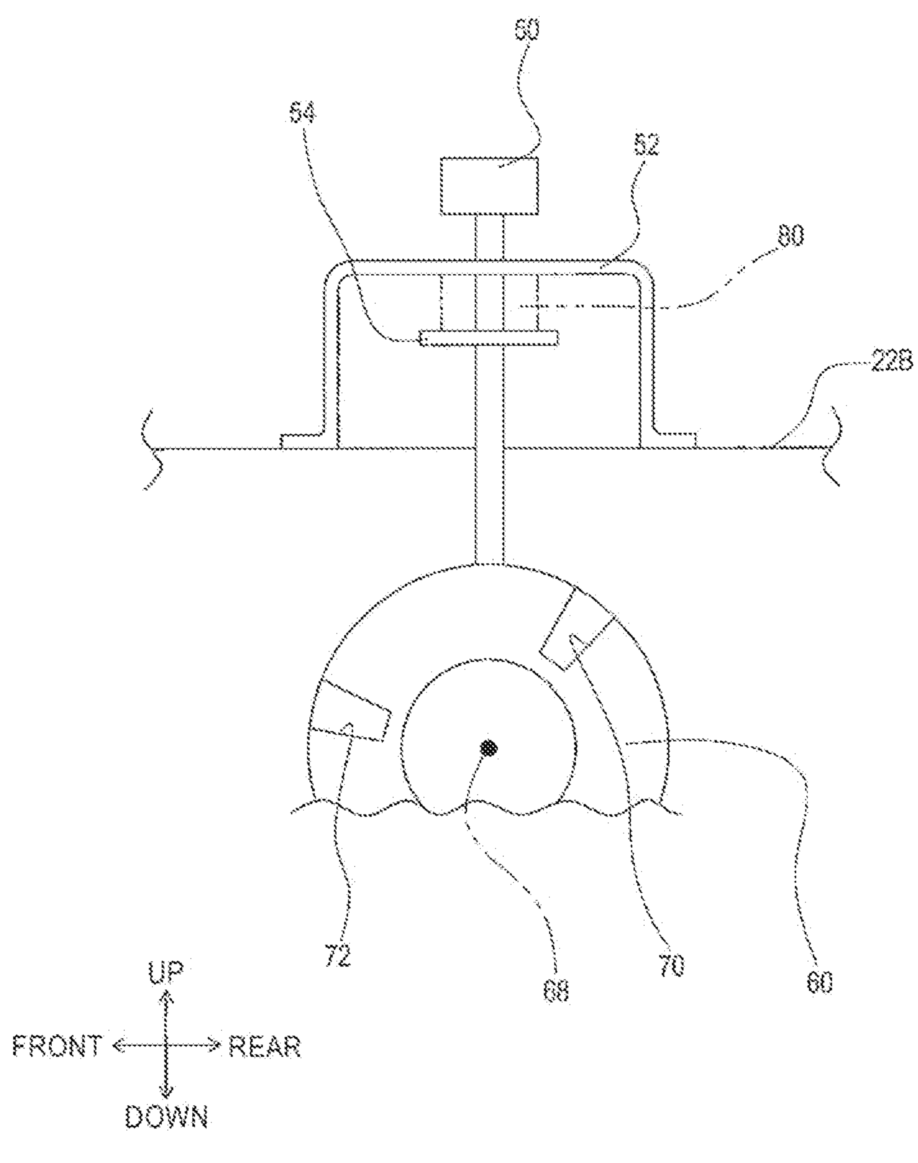
FIG. 16 depicts a modified example of the laser marker.

As shown in FIG. 16, the coil spring 80 may also be arranged between the attaching plate 52 and the collar portion 54 of the pin 50. In this case, the pin 50 is urged (downward) from the housing-side hole portion 29 toward the connecting part 90 by the coil spring 80. For this reason, in the case where the rotation position of the second housing 30 is not in the first rotation position and the second rotation position, the pin 50 is in contact with the outer peripheral surface of the connecting member 60.

The lock mechanism L may be constituted by providing one of the first housing 20 and the second housing 30 with a pin and providing the other with a hole portion through which the pin passes. Alternatively, the lock mechanism L may be constituted by providing both the first housing 20 and the second housing 30 with hole portions and enabling a pin to pass therethrough.

The lock mechanism L may also be constituted by a clamp tightening and fixing the first housing 20 and the second housing 30.

Alternatively, the lock mechanism L may be constituted by providing one housing of the first housing 20 and the second housing 30 with a claw portion and the other housing with a groove portion to which the claw portion is engaged. In this case, the claw portion is engaged to the groove portion in the case where the rotation position of the second housing 30 is in the first rotation position or the second rotation position by the rotation of the second housing 30, and separates from the groove portion in the case where the rotation position of the second housing 30 is between the first rotation position and the second rotation position. Note that, the claw portion or groove portion may also be provided to the connecting member 60.

The tip end 56 of the pin 50 may not be tapered. In this case, the first hole portion 70 and the second hole portion 72 are formed such that the inner diameters thereof gradually decrease toward the inner sides, like the present illustrative embodiment. Thereby, the pin 50 is guided to the first hole portion 70 and the second hole portion 72. The first hole portion 70 and the second hole portion 72 may not be formed such that the inner diameters thereof gradually decrease toward the inner sides. In this case, the tip end 56 of the pin 50 is tapered, like the present illustrative embodiment, such that the pin 50 is guided to the first hole portion 70 and the second hole portion 72.

The rotation position of the second housing 30 may also be indicated by a high signal and a low signal or may also be indicated by information, unlike the present illustrative embodiment where the rotation position is indicated by binary signals of the on-signal and the off-signal.

The emission control of the laser marker 1 of the present illustrative embodiment may be executed only by the FGPA 211 or only by the CPU 203.

The emission impossible processing S16 may also be executed by moving a shield plate onto the light path of the laser light Q or the visible laser light R while keeping the state where the laser unit 10 emits the laser light Q or the state where the visible semiconductor laser 19 emits the visible laser light R. In this case, the emission possible processing S26 is executed by moving the shield plate from the light path of the laser light Q or the visible laser light R.

What is claimed is:

1. A laser marker comprising:

a laser light source;

a scanner configured to two-dimensionally scan laser light, from the laser light source, outward, the scanner having a first scanning mirror and a second scanning mirror;

a first housing accommodating the laser light source;

a second housing connected to the first housing and accommodating the scanner, the second housing being rotatable with respect to the first housing;

a sensor configured to output a detection signal, the detection signal indicating a rotation position of the second housing with respect to the first housing; and a controller configured to:

determine, based on the detection signal from the sensor, whether a sensor state is a first state or a second state, the first state indicating that the rotation position of the second housing is either in a first rotation position or in a second rotation position, the second state indicating that the rotation position of the second housing is between the first rotation position and the second rotation position, the second rotation position being perpendicular to the first rotation position;

control the laser light source to emit the laser light outward when determined that the sensor state is in the first state; and control the laser light source not to emit the laser light outward when determined that the sensor state is in the second state.

2. The laser marker according to claim 1, further comprising:

a user interface configured to receive designation information, the designation information designating any one of the first rotation position or the second rotation position as the rotation position of the second housing, wherein in a case a rotation position of the second housing indicated by the designation information input by the user interface matches the rotation position of the second housing indicated by the detection signal output from the sensor, the controller is configured to control the laser light source to emit the laser light outward, and wherein in a case the rotation position of the second housing indicated by the designation information input by the user interface is different from the rotation position of the second housing indicated by the detection signal output from the sensor, the controller is configured to control the laser light source not to emit the laser light outward.

3. The laser marker according to claim 2, wherein in a case the rotation position of the second housing is changed from one of the first rotation position and the second rotation position to the other of the first rotation position and the second rotation position, the controller is configured to control the laser light source not to emit the laser light outward until the user interface receives designation information of designating the other of the first rotation position and the second rotation position as the rotation position of the second housing.

4. The laser marker according to claim 1, wherein the sensor comprises:

a first sensor configured to detect that the rotation position of the second housing is in the first rotation position; and a second sensor configured to detect that the rotation position of the second housing is in the second rotation position, wherein in a case either only the first sensor detects that the rotation position of the second housing is in the first rotation position or only the second sensor detects that the rotation position of the second housing is in the second rotation position, the controller is configured to control the laser light source to emit the laser light outward, and wherein in a case neither the first sensor detects that the rotation position of the second housing is in the first rotation position nor the second sensor detects that the rotation position of the second housing is in the second rotation position, the controller is configured to control the laser light source not to emit the laser light outward.

5. The laser marker according to claim 4, wherein in a case both the first sensor detects that the rotation position of the second housing is in the first rotation position and the second sensor detects that the rotation position of the second housing is in the second rotation position, the controller is configured to control the laser light source not to emit the laser light outward.

6. The laser marker according to claim 4, wherein a first direction from the first sensor toward a rotation center of the second housing and a second direction from the second sensor toward the rotation center of the second housing are orthogonal to each other.

7. The laser marker according to claim 1, wherein the controller is configured to:

in a case the detection signal, from the sensor, indicates that the rotation position of the second housing is either in the first rotation position or in the second rotation position, execute power supplying to the laser light source; and in a case the detection signal, output from the sensor, does not indicate that the rotation position of the second housing is either in the first rotation position or in the second rotation position, cut off the power supplying to the laser light source.

8. The laser marker according to claim 1, wherein in a case the detection signal, from the sensor, does not indicate that the rotation position of the second housing is either in the first rotation position or in the second rotation position, the controller is configured to stop drive control on the scanner.

9. The laser marker according to claim 1, further comprising:

a notification device configured to perform a notification notifying that the rotation position of the second housing is other than in the first rotation position and in the second rotation position, wherein in a case the detection signal, from the sensor, does not indicate that the rotation position of the second housing is either in the first rotation position or in the second rotation position, the controller is configured to control the notification device to perform the notification.

10. The laser marker according to claim 1, further comprising:

a guide light source configured to emit visible light scanned outward by the scanner, wherein in a case the detection signal, from the sensor, does not indicate that the rotation position of the second housing is either in the first rotation position or in the second rotation position, the controller is configured to control the guide light source not to emit the visible light outward.

11. The laser marker according to claim 1, further comprising:

a connecting part having a first end fixed to the second housing and a second end rotatably inserted in the first housing, the second end being opposite to the first end, the connecting part being configured to connect the first housing and the second housing each other; and a detected portion protruding from an outer peripheral surface of the second end of the connecting part away from a rotation center of the connecting part, the detected portion being detected by the sensor in a case the rotation position of the second housing is either in the first rotation position or in the second rotation position.

12. The laser marker according to claim 1, further comprising:

a connecting part configured to enable the second housing to be rotatable with respect to the first housing; and a lock mechanism configured to fix the rotation position of the second housing either in the first rotation position or in the second rotation position.

13. The laser marker according to claim 12, wherein a first end of the connecting part is fixed to one of the first housing and the second housing, wherein a second end of the connecting part is rotatably attached to the other of the first housing and the second housing, the second end being opposite to the first end, wherein the connecting part has a hollow structure communicating the first end of the connecting part with the second end of the connecting part, and wherein the lock mechanism is configured to fix rotation of the connecting part on the other of the first housing and the second housing.

14. The laser marker according to claim 13, wherein the first end of the connecting part is fixed to the second housing, and wherein the second end of the connecting part is rotatably attached to the first housing.

15. The laser marker according to claim 14, wherein the lock mechanism comprises:

a housing-side hole portion provided to the first housing;

a connecting part-side hole portion provided to the connecting part; and a pin insertable in the connecting part-side hole portion with penetrating the housing-side hole portion.

16. The laser marker according to claim 15, wherein the connecting part-side hole portion comprises:

a first hole portion corresponding to the first rotation position; and a second hole portion corresponding to the second rotation position.

17. The laser marker according to claim 16, wherein a first direction from the first hole portion toward a rotation center of the connecting part and a second direction from the second hole portion toward the rotation center of the connecting part are orthogonal to each other.

18. The laser marker according to claim 15, further comprising:

a male screw provided to the pin; and a female screw provided to the housing-side hole portion and configured to be screwed with the male screw.

19. The laser marker according to claim 15, wherein a tip end of the pin has a tapered shape.

20. The laser marker according to claim 15, wherein an inner diameter of the connecting part-side hole portion gradually decreases toward a rotation center of the connecting part up to a predetermined depth.

21. The laser marker according to claim 15, wherein the lock mechanism comprises a spring configured to urge the pin in a direction in which the pin separates from the connecting part.

22. The laser marker according to claim 15, wherein the lock mechanism comprises a spring configured to urge the pin toward the connecting part.

23. The laser marker according to claim 15, wherein the lock mechanism comprises:

a protrusion protruding, from an outer peripheral surface of the second end of the connecting part, away from a rotation center of the connecting part;

a first wall surface part provided to the first housing and in contact with the protrusion in a case the rotation position of the second housing is in the first rotation position; and a second wall surface part provided to the first housing and in contact with the protrusion in a case the rotation position of the second housing is in the second rotation position.

24. The laser marker according to claim 12, wherein the lock mechanism comprises:

a pin; and a hole portion, into which the pin is insertable.

* * * * *